(12) United States Patent
Bartel et al.

(10) Patent No.: US 11,344,078 B2
(45) Date of Patent: May 31, 2022

(54) OUTSOLE PLATE

(71) Applicant: NIKE, Inc., Beaverton, OR (US)

(72) Inventors: Aaron Bartel, Beaverton, OR (US); Sam Lacey, Portland, OR (US); Adam Thuss, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/383,116

(22) Filed: Apr. 12, 2019

(65) Prior Publication Data

US 2019/0313733 A1   Oct. 17, 2019

Related U.S. Application Data

(60) Provisional application No. 62/658,195, filed on Apr. 16, 2018.

(51) Int. Cl.

| A43B 13/12 | (2006.01) |
| A43B 5/00 | (2006.01) |
| A43B 13/02 | (2006.01) |
| A43B 13/04 | (2006.01) |
| A43B 13/22 | (2006.01) |

(52) U.S. Cl.
CPC ............. *A43B 13/122* (2013.01); *A43B 5/00* (2013.01); *A43B 13/026* (2013.01); *A43B 13/04* (2013.01); *A43B 13/223* (2013.01)

(58) Field of Classification Search
CPC ....... A43B 13/122; A43B 5/00; A43B 13/026; A43B 13/04; A43B 13/223
See application file for complete search history.

(56) References Cited

U.S. PATENT DOCUMENTS

| 859,382 A | 7/1907 | Hansen |
| 1,548,806 A | 8/1925 | Perry |
| 2,203,929 A | 6/1940 | Shapiro |
| 2,333,303 A | 11/1943 | Enos |
| 2,391,564 A | 12/1945 | Gregg |

(Continued)

FOREIGN PATENT DOCUMENTS

| CN | 2633059 Y | 8/2004 |
| CN | 101090649 A | 12/2007 |

(Continued)

OTHER PUBLICATIONS

China National Intellectual Property Administration, Notification of the First Office Action and Search Report for No. 201680064966.9, dated Mar. 27, 2020.

(Continued)

*Primary Examiner* — Sharon M Prange
*Assistant Examiner* — Erick I Lopez
(74) *Attorney, Agent, or Firm* — Honigman LLP; Matthew H. Szalach; Jonathan O'Brien

(57) ABSTRACT

A sole structure for an article of footwear includes a component including a first bundle of fibers affixed to a substrate, a ground-engaging assembly including a first traction element, a second traction element, and a connecting member extending between and connecting the first traction element and the second traction element, and a resin consolidating the first bundle of fibers and entrapping the connecting member to fix a position of the first traction element, the second traction element, and the connecting member relative to the substrate.

14 Claims, 27 Drawing Sheets

(56) References Cited

U.S. PATENT DOCUMENTS

| | | | |
|---|---|---|---|
| 2,408,736 A | 10/1946 | Codish | |
| 2,421,932 A | 6/1947 | Goldstein | |
| 2,430,497 A | 11/1947 | Enright | |
| 2,808,663 A | 10/1957 | Frieder | |
| 3,328,901 A * | 7/1967 | Strickland | A43C 15/161 36/59 R |
| 3,442,032 A | 5/1969 | Jonas | |
| 3,738,026 A * | 6/1973 | Granger | A43B 5/001 36/59 R |
| 4,079,568 A | 3/1978 | Wortman | |
| 4,271,608 A | 6/1981 | Tomuro | |
| 4,318,231 A | 3/1982 | Simoneau | |
| 4,439,934 A | 4/1984 | Brown | |
| 4,439,937 A | 4/1984 | Daswick | |
| 4,454,664 A * | 6/1984 | MacNeil | A43C 15/161 36/114 |
| 4,651,445 A | 3/1987 | Hannibal | |
| 4,651,448 A * | 3/1987 | Chen | A43C 15/161 36/127 |
| 4,774,954 A | 10/1988 | Ibrahim | |
| 4,813,090 A | 3/1989 | Ibrahim | |
| 4,815,221 A | 3/1989 | Diaz | |
| 4,821,430 A | 4/1989 | Flemming et al. | |
| 4,922,636 A * | 5/1990 | Chen | A43B 5/001 36/127 |
| 4,955,148 A | 9/1990 | Padilla | |
| 5,025,573 A | 6/1991 | Giese et al. | |
| 5,052,130 A | 10/1991 | Barry et al. | |
| 5,142,797 A | 9/1992 | Cole, III | |
| 5,401,564 A | 3/1995 | Lee et al. | |
| 5,406,723 A | 4/1995 | Okajima | |
| 5,529,826 A | 6/1996 | Tailor et al. | |
| 5,918,338 A | 7/1999 | Wong | |
| 5,932,336 A * | 8/1999 | Allen | A43B 13/12 428/315.5 |
| 6,199,303 B1 | 3/2001 | Luthi et al. | |
| 6,389,713 B1 | 5/2002 | Kita | |
| 6,594,922 B1 | 7/2003 | Mansfield et al. | |
| 6,684,532 B2 | 2/2004 | Greene et al. | |
| 7,013,581 B2 | 3/2006 | Greene et al. | |
| 7,013,583 B2 | 3/2006 | Greene et al. | |
| 7,062,865 B1 | 6/2006 | Nordt, III | |
| 7,401,422 B1 | 7/2008 | Scholz et al. | |
| 7,421,808 B2 | 9/2008 | Baier et al. | |
| 7,437,838 B2 | 10/2008 | Nau | |
| 7,832,117 B2 | 11/2010 | Auger et al. | |
| 7,886,460 B2 | 2/2011 | Teteriatnikov et al. | |
| 7,934,327 B2 | 5/2011 | Gebhard | |
| 7,941,940 B2 | 5/2011 | Teteriatnikov et al. | |
| 8,256,145 B2 * | 9/2012 | Baucom | A47G 27/0212 36/61 |
| 8,381,416 B2 | 2/2013 | Geer et al. | |
| 8,850,718 B2 | 10/2014 | Lubart | |
| 9,610,746 B2 | 4/2017 | Wardlaw et al. | |
| 9,930,934 B2 * | 4/2018 | Cook | A43B 13/026 |
| 10,743,606 B2 | 8/2020 | Bartel et al. | |
| 10,952,498 B2 | 3/2021 | Bruce et al. | |
| 11,089,834 B2 | 8/2021 | Chambers et al. | |
| 2002/0011146 A1 | 1/2002 | Vaz | |
| 2002/0152642 A1 | 10/2002 | Chu | |
| 2002/0178615 A1 * | 12/2002 | Saillet | A43B 13/12 36/85 |
| 2003/0051372 A1 | 3/2003 | Lyden | |
| 2003/0069807 A1 | 4/2003 | Lyden | |
| 2003/0121179 A1 | 7/2003 | Chen | |
| 2003/0221337 A1 | 12/2003 | Farys et al. | |
| 2004/0123495 A1 | 7/2004 | Greene et al. | |
| 2004/0197529 A1 | 10/2004 | Cadamuro et al. | |
| 2004/0205983 A1 | 10/2004 | Talbott | |
| 2005/0022425 A1 | 2/2005 | Brown | |
| 2005/0108897 A1 | 5/2005 | Aveni | |
| 2005/0248749 A1 | 11/2005 | Kiehn et al. | |
| 2005/0262737 A1 | 12/2005 | Vattes | |
| 2007/0017124 A1 | 1/2007 | Koo et al. | |
| 2007/0043630 A1 | 2/2007 | Lyden | |
| 2009/0090031 A1 | 4/2009 | Jung | |
| 2009/0094858 A1 | 4/2009 | Ungari et al. | |
| 2009/0288312 A1 | 11/2009 | Dua | |
| 2010/0263234 A1 | 10/2010 | Teteriatnikov et al. | |
| 2010/0263239 A1 | 10/2010 | Biancucci et al. | |
| 2010/0275471 A1 | 11/2010 | Teteriatnikov et al. | |
| 2010/0281716 A1 | 11/2010 | Luthi et al. | |
| 2010/0307028 A1 | 12/2010 | Teteriatnikov et al. | |
| 2011/0078923 A1 | 4/2011 | Bartholet et al. | |
| 2011/0113649 A1 | 5/2011 | Merritt et al. | |
| 2011/0119959 A1 | 5/2011 | Bodner | |
| 2012/0137544 A1 | 6/2012 | Rosa et al. | |
| 2012/0198723 A1 | 8/2012 | Borisov | |
| 2012/0266500 A1 | 10/2012 | Cobb | |
| 2012/0297641 A1 | 11/2012 | Pfister | |
| 2013/0125421 A1 | 5/2013 | Stegmaier et al. | |
| 2014/0026444 A1 * | 1/2014 | Howley | A43B 13/04 36/134 |
| 2014/0059895 A1 | 3/2014 | Arciuolo | |
| 2014/0134378 A1 | 5/2014 | Downs et al. | |
| 2014/0223673 A1 | 8/2014 | Wardlaw et al. | |
| 2014/0259462 A1 | 9/2014 | Taylor et al. | |
| 2015/0040428 A1 * | 2/2015 | Davis | B29D 35/142 36/83 |
| 2015/0107133 A1 | 4/2015 | Ganuza et al. | |
| 2015/0113829 A1 | 4/2015 | Kodad | |
| 2015/0196082 A1 * | 7/2015 | Van Atta | A43B 13/122 36/103 |
| 2015/0196087 A1 * | 7/2015 | Meschter | A43B 13/188 36/25 R |
| 2016/0031164 A1 | 2/2016 | Downs et al. | |
| 2016/0058107 A1 * | 3/2016 | Walker | A43B 3/0036 36/98 |
| 2016/0114546 A1 | 4/2016 | Yang | |
| 2016/0152825 A1 | 6/2016 | Lomoelder et al. | |
| 2016/0206046 A1 | 7/2016 | Cross | |
| 2017/0006962 A1 | 1/2017 | Tanabe et al. | |
| 2017/0071291 A1 | 3/2017 | Follet et al. | |
| 2017/0095033 A1 | 4/2017 | Farina et al. | |
| 2017/0095034 A1 | 4/2017 | Dupre et al. | |
| 2017/0157893 A1 | 6/2017 | Simmons et al. | |
| 2017/0196305 A1 * | 7/2017 | Barnes | A43B 5/02 |
| 2017/0196306 A1 | 7/2017 | Arciuolo | |
| 2017/0202309 A1 | 7/2017 | Sterman et al. | |
| 2017/0368722 A1 * | 12/2017 | Jacobsen | A43B 17/00 |
| 2018/0020762 A1 | 1/2018 | Jamison | |
| 2018/0177261 A1 | 6/2018 | Amis et al. | |
| 2018/0192736 A1 | 7/2018 | Luedecke | |
| 2019/0223546 A1 | 7/2019 | Bartel et al. | |
| 2019/0225784 A1 * | 7/2019 | Farr | C08K 5/1575 |
| 2019/0313733 A1 | 10/2019 | Bartel et al. | |

FOREIGN PATENT DOCUMENTS

| | | |
|---|---|---|
| CN | 101166435 A | 4/2008 |
| CN | 101516222 A | 8/2009 |
| CN | 102711543 A | 10/2012 |
| CN | 202950081 U | 5/2013 |
| CN | 103813730 A | 5/2014 |
| CN | 105239261 A | 1/2016 |
| CN | 105361343 A | 3/2016 |
| CN | 106102501 A | 11/2016 |
| DE | 2108204 A1 | 8/1972 |
| DE | 2736974 A1 | 3/1979 |
| DE | 4210292 A1 | 9/1993 |
| EP | 0931470 A2 | 7/1999 |
| EP | 1249184 A1 | 10/2002 |
| EP | 1405577 A2 | 4/2004 |
| EP | 1857005 A1 | 11/2007 |
| EP | 1869989 A1 | 12/2007 |
| EP | 2105058 A1 | 9/2009 |
| EP | 2105058 B1 | 12/2011 |
| EP | 2462827 A2 | 6/2012 |
| EP | 3075277 A2 | 10/2016 |
| EP | 3349608 A1 | 7/2018 |
| JP | 2000106905 A | 4/2000 |
| JP | 2007268025 A | 10/2007 |

(56) References Cited

FOREIGN PATENT DOCUMENTS

| | | |
|---|---|---|
| JP | 5649151 B1 | 1/2015 |
| KR | 100912386 B1 | 8/2009 |
| KR | 10-2011-0004572 A | 1/2011 |
| KR | 20130000467 U | 1/2013 |
| WO | WO-1991/01660 A1 | 2/1991 |
| WO | WO-9101660 | 2/1991 |
| WO | WO-1994/21454 A1 | 9/1994 |
| WO | WO-2000/41544 A2 | 7/2000 |
| WO | WO-0041544 | 7/2000 |
| WO | WO-2009069871 A1 | 6/2009 |
| WO | WO-2011043507 A1 | 4/2011 |
| WO | WO-2016004360 A1 | 1/2016 |
| WO | WO-2016179265 A1 | 11/2016 |
| WO | WO-2017058419 A1 | 4/2017 |
| WO | WO-2018017890 A1 | 1/2018 |
| WO | WO-2018017893 A1 | 1/2018 |

OTHER PUBLICATIONS

China National Intellectual Property Administration, Notification of the First Office Action and Search Report for No. 201680064951.2, dated Mar. 27, 2020.

Japan Patent Office, Notice of Reasons for Rejection for JP Application No. 2018-516734, dated Jun. 3, 2019.

Korean Intellectual Property Office, Office Action for KR Application No. 10-2018-7012450, dated Jun. 19, 2019.

Korean Intellectual Property Office, Office Action for KR Application No. 10-2018-7012449, dated Jun. 19, 2019.

European Patent Office (ISA), International Search Report and Written Opinion for PCT Application No. PCT/US2019/027470, dated Jul. 25, 2019.

United States Patent and Trademark Office, Notice of Allowance for U.S. Appl. No. 15/574,933, dated Mar. 4, 2019.

United States Patent and Trademark Office, Non-Final Office Action for U.S. Appl. No. 15/574,912, dated Jun. 6, 2019.

CompositesWorld. "Composites 101: Fibers and resins," URL= https://www.compositesworld.com/articles/composites-101-fibers-and-resins. Accessed Jun. 5, 2020. Published Mar. 14, 2016. (Year 2016).

United States Patent and Trademark Office, Non-Final Office Action for U.S. Appl. No. 15/905,036, dated Jun. 10, 2020.

International Searcing Authority (EPO), International Search Report and Written Opinion for International Application No. PCT/US2017/043164, dated Oct. 24, 2017.

International Searcing Authority (EPO), International Prelimiary Report on Patentability for International Application No. PCT/US2017/043164, dated Jul. 24, 2018.

European Patent Office as the International Searching Authority, International Search Report and Written Opinion for Application No. PCT/US2016/030759, dated Jul. 12, 2016.

Stefanyshyn, D.J. et al., "Energy Aspects Associated with Sports Shoes," Sportverl Sportschad, vol. 14, pp. 82-89, Georg Thieme Verlag, Stuttgart, DE, 2000.

Stefanyshyn, D.J. et al., "Influence of a midsole bending stiffness on joint energy and jump height performance," Medicine & Science in Sports & Exercise, vol. 32, No. 2, pp. 471-476, American College of Sports Medicine, 2000.

Stefanyshyn, D.J. et al., "Mechanical Energy Contribution of the Metatarsophalangeal Join to Running and Sprinting," J. Biomechanics, vol. 30, Nos. 11-12, pp. 1081-1085, Elsevier Science Ltd, 1997.

Nigg, Benno M. et al., "Shoes Inserts and Orthotics for Sport and Physical Activities," Medicine & Science in Sports & Exercise, vol. 31, Issue 7, pp. S421-S428, Jul. 1999.

Roy, Jean-Pierre R. et al., "Shoes Midsole Longitudinal Bending Stiffness and Running Economy, Joint Energy, and EMG," Medicine & Science in Sports & Excercise, vol. 38, No. 3, pp. 562-569, American College of Sports Medicine, 2006.

European Patent Office as the International Searching Authority, International Search Report and Written Opinion for Application No. PCT/US2016/048859, dated Nov. 7, 2016.

European Patent Office as the International Searching Authority, International Search Report and Written Opinion for Application No. PCT/US2016/048854, dated Nov. 25, 2016.

European Patent Office as the International Searching Authority, International Search Report and Written Opinion for Application No. PCT/US2017/043170, dated Oct. 27, 2017.

European Patent Office as the International Searching Authority, International Search Report and Written Opinion for Application No. PCT/US2017/043164, dated Oct. 24, 2017.

European Patent Office as the International Searching Authority, International Search Report and Written Opinion for Application No. PCT/US2017/043160, dated Oct. 24, 2017.

European Patent Office as the International Searching Authority, International Search Report and Written Opinion for Application No. PCT/US2017/043167, dated Oct. 27, 2017.

European Patent Office (ISA), International Preliminary Report on Patentabilty for Application No. PCT/2017/043160, dated Jul. 24, 2018.

European Patent Office (ISA), International Preliminary Report on Patentabilty for Application No. PCT/2017/043164, dated Jul. 24, 2018.

European Patent Office (ISA), International Preliminary Report on Patentabilty for Application No. PCT/2017/043170, dated Jul. 24, 2018.

European Patent Office (ISA), International Preliminary Report on Patentabilty for Application No. PCT/2017/043167, dated Jul. 24, 2018.

United States Patent and Trademark Office, Office Action for U.S. Appl. No. 15/248,051, dated Dec. 10, 2018.

European Patent Office (ISA), International Preliminary Report on Patentability for International Application No. PCT/US2016/048854, dated Apr. 12, 2018.

European Patent Office (ISA), International Preliminary Report on Patentability for International Application No. PCT/US2016/048859, dated Apr. 12, 2018.

European Patent Office (ISA), International Search Report and Written Opinion for PCT Application No. PCT/US2019/027480, dated Aug. 9, 2019.

Japan Patent Office, Notice of Reasons for Rejection for JP Application No. 2018-516733, dated Jun. 17, 2019.

United States Patent and Trademark Office, Office Action for U.S. Appl. No. 15/248,059, dated Jun. 6, 2018.

United States Patent and Trademark Office, Office Action for U.S. Appl. No. 16/318,735, dated Jul. 9, 2019.

Japan Patent Office, Notice of Reasons for Rejection for JP Application No. 2018-516734, dated Dec. 10, 2019.

United States Patent and Trademark Office, Notice of Allowance and Fee(s) Due for U.S. Appl. No. 16/384,154, dated Jan. 21, 2020.

United States Patent and Trademark Office, Non-Final Office Action for U.S. Appl. No. 15/904,664, dated Jan. 2, 2020.

United States Patent and Trademark Office, Non-Final Office Action for U.S. Appl. No. 15/248,051, dated Jan. 2, 2020.

United States Patent and Trademark Office, Notice of Allowance and Fee(s) Due for U.S. Appl. No. 15/904,568, dated Dec. 10, 2019.

Korean Intellectual Property Office, Office Action for Application No. 10-2019-7004900, dated Feb. 17, 2020.

Korean Intellectual Property Office, Office Action for Application No. 10-2018-7012450, dated Jan. 30, 2020.

United States Patent and Trademark Office, Non-Final Office Action for U.S. Appl. No. 15/248,051, dated May 15, 2018.

"Youngs Modulus is a Measure of Stiffness". ChristineDeMerchant. com. URL=https://www.christinedemerchant.com/youngsmodulus.html. Accessed Dec. 4, 2018. (Year: 2012).

Korean Intellectual Property Office, Office Action for Application No. 10-2018-7012449, dated Feb. 24, 2020.

Japan Patent Office, Notice of Reasons for Rejection for JP Application No. 2018-516733, dated Feb. 28, 2020.

European Patent Office, Communication pursuant to Article 94(3) EPC for EP Application No. 16760309.1, dated Mar. 5, 2020.

(56) References Cited

OTHER PUBLICATIONS

Korean Intellectual Property Office, Office Action for Application No. 10-2019-7004898, dated Feb. 17, 2020.
Korean Intellectual Property Office, Office Action for Application No. 10-2019-7004899, dated Feb. 17, 2020.
Japan Patent Office, Notice of Reasons for Rejection for JP Application No. 2018-516734, dated Aug. 4, 2020.
China National Intellectual Property Administration, Notification of First Office Action forCN Application No. 201780044388.7, dated Jun. 30, 2020.
China National Intellectual Property Administration, Notification of First Office Action for CN Application No. 201780044468.2, dated Jul. 1, 2020.
China Patent Office, Office Action dated May 21, 2021 for Application No. 201980007331.9.
United States Patent and Trademark Office Non-Final Office Action for U.S. Appl. No. 17/231,349 dated Jun. 15, 2021.
United States Patent and Trademark Office, Non-Final Office Action for U.S. Appl. No. 17/231,617 dated Oct. 4, 2021.
Japanese Patent Office, Office Action for Application No. 2020-180295 dated Nov. 16, 2021.
China National Intellectual Property Administration, Second Office Action for application No. 201980007331.9 dated Nov. 25, 2021.

\* cited by examiner

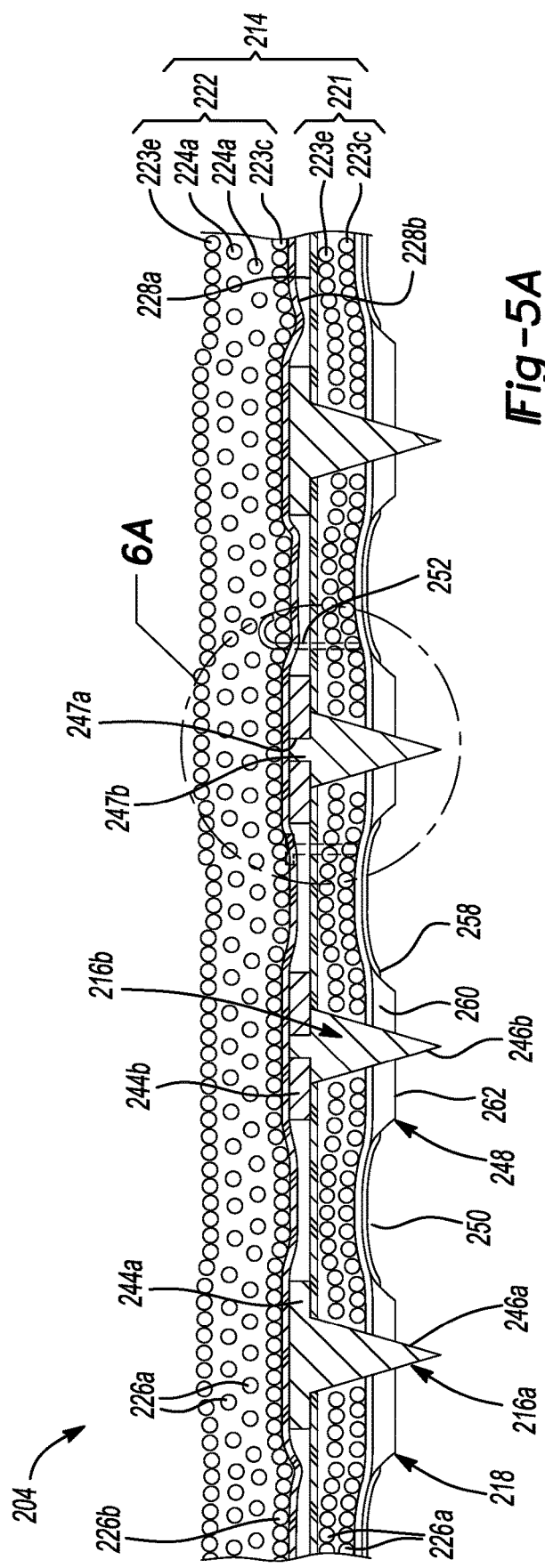
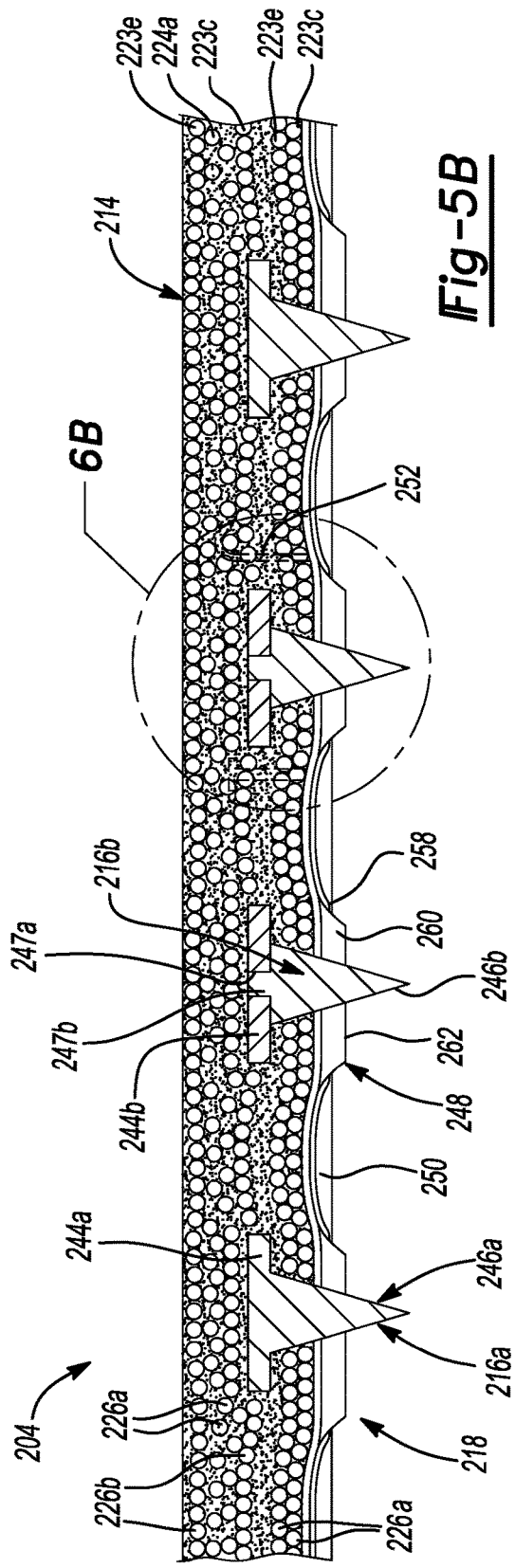
Fig-5A
Fig-5B

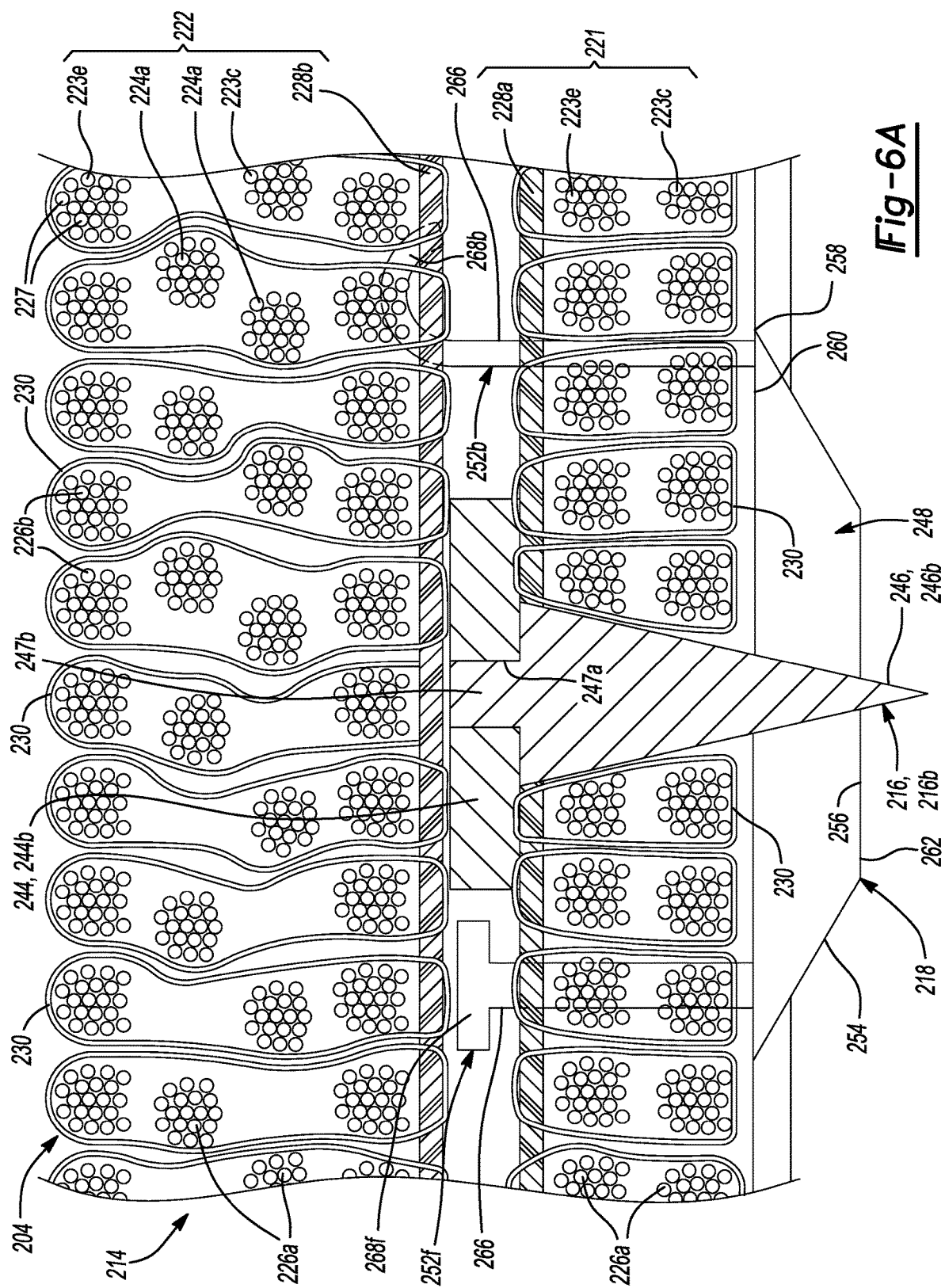

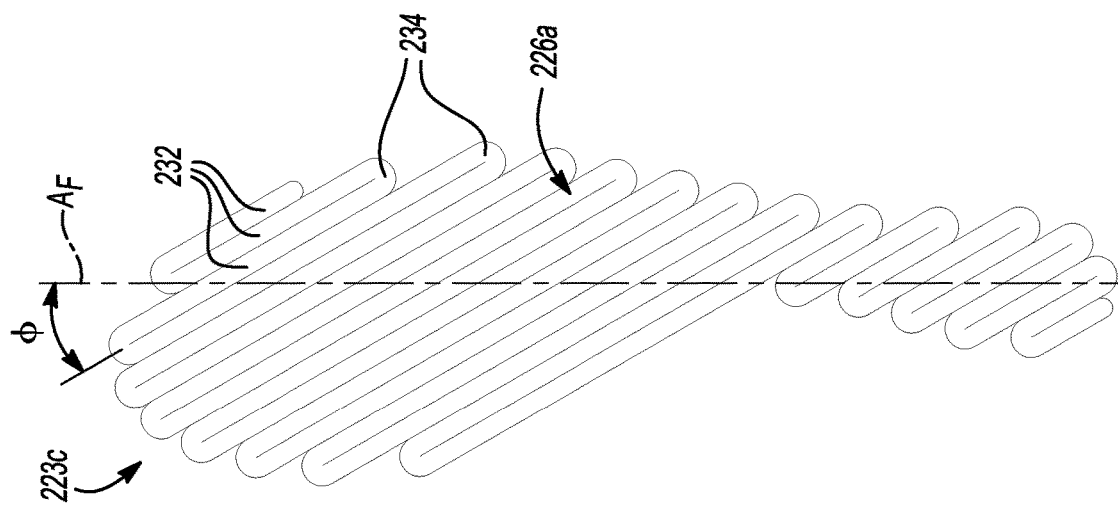
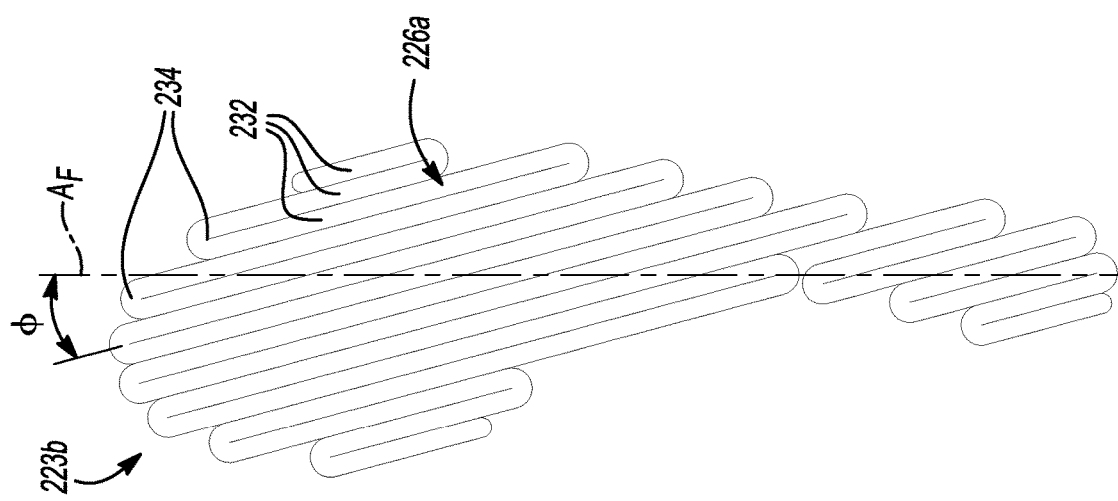
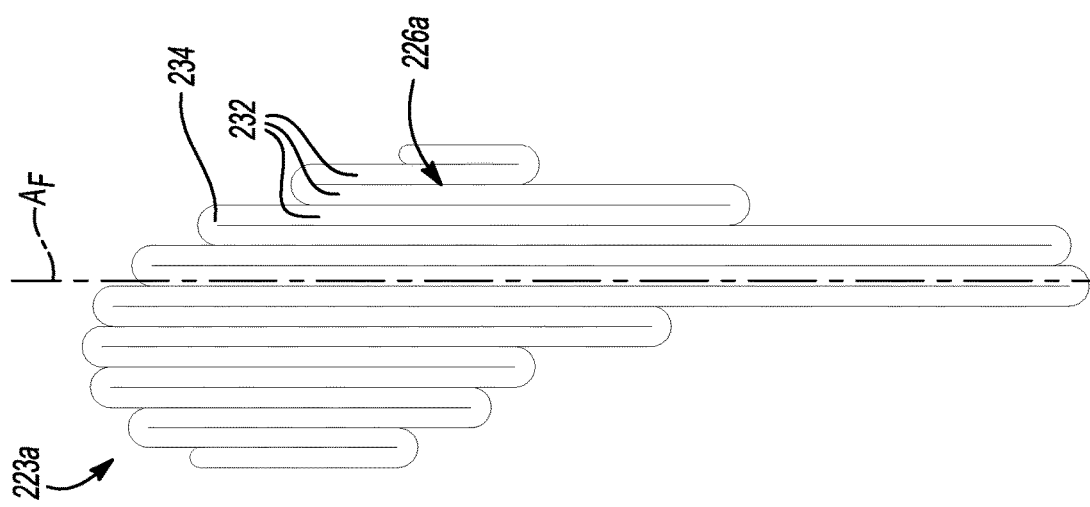

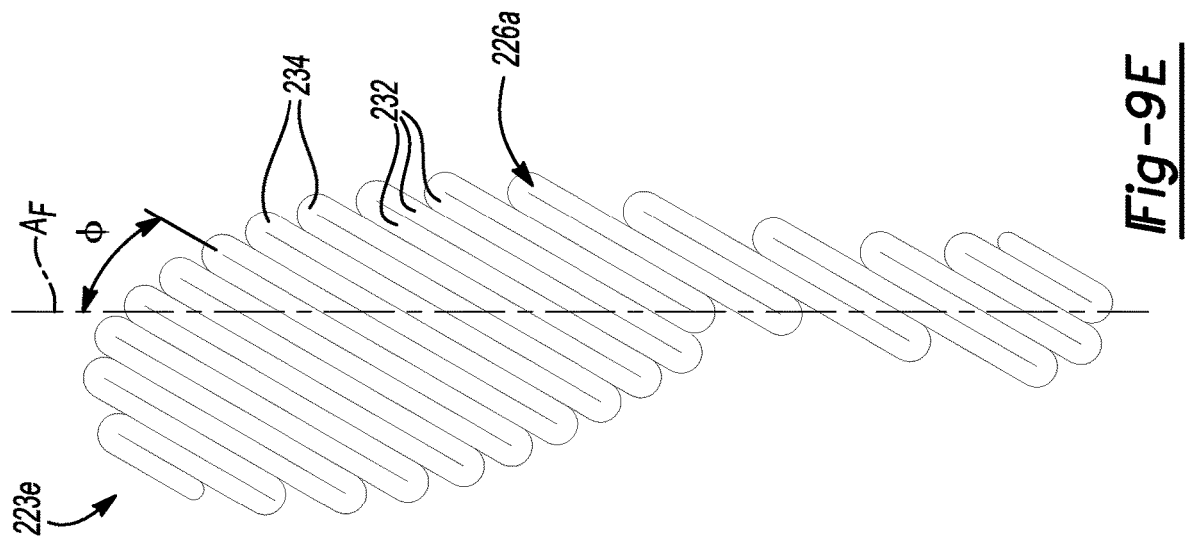
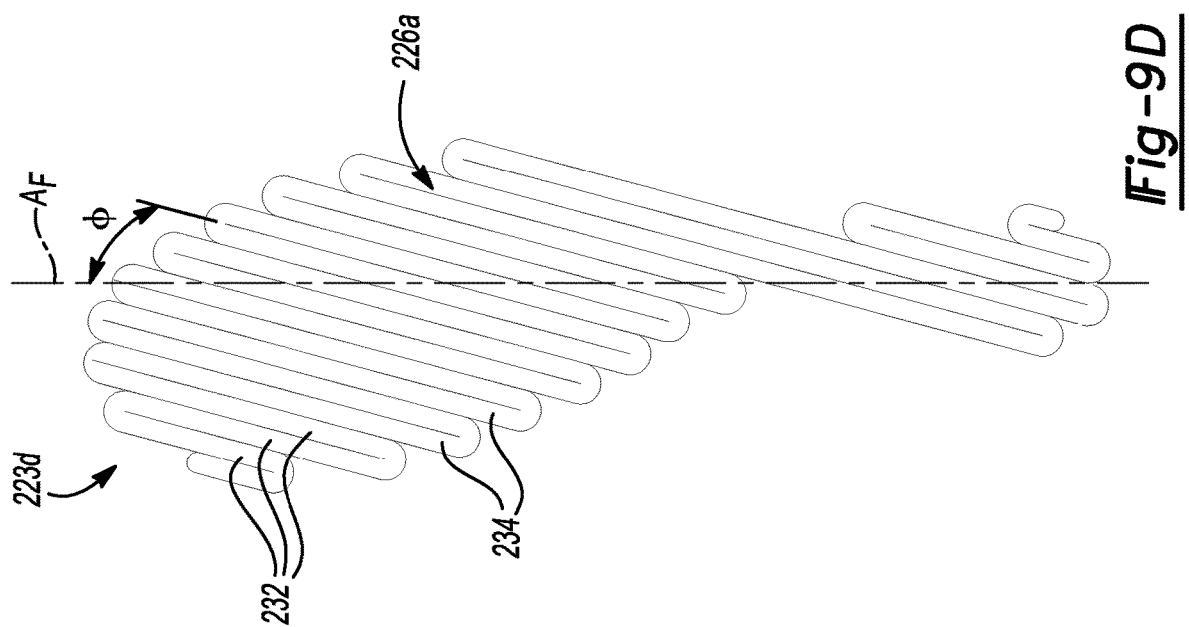

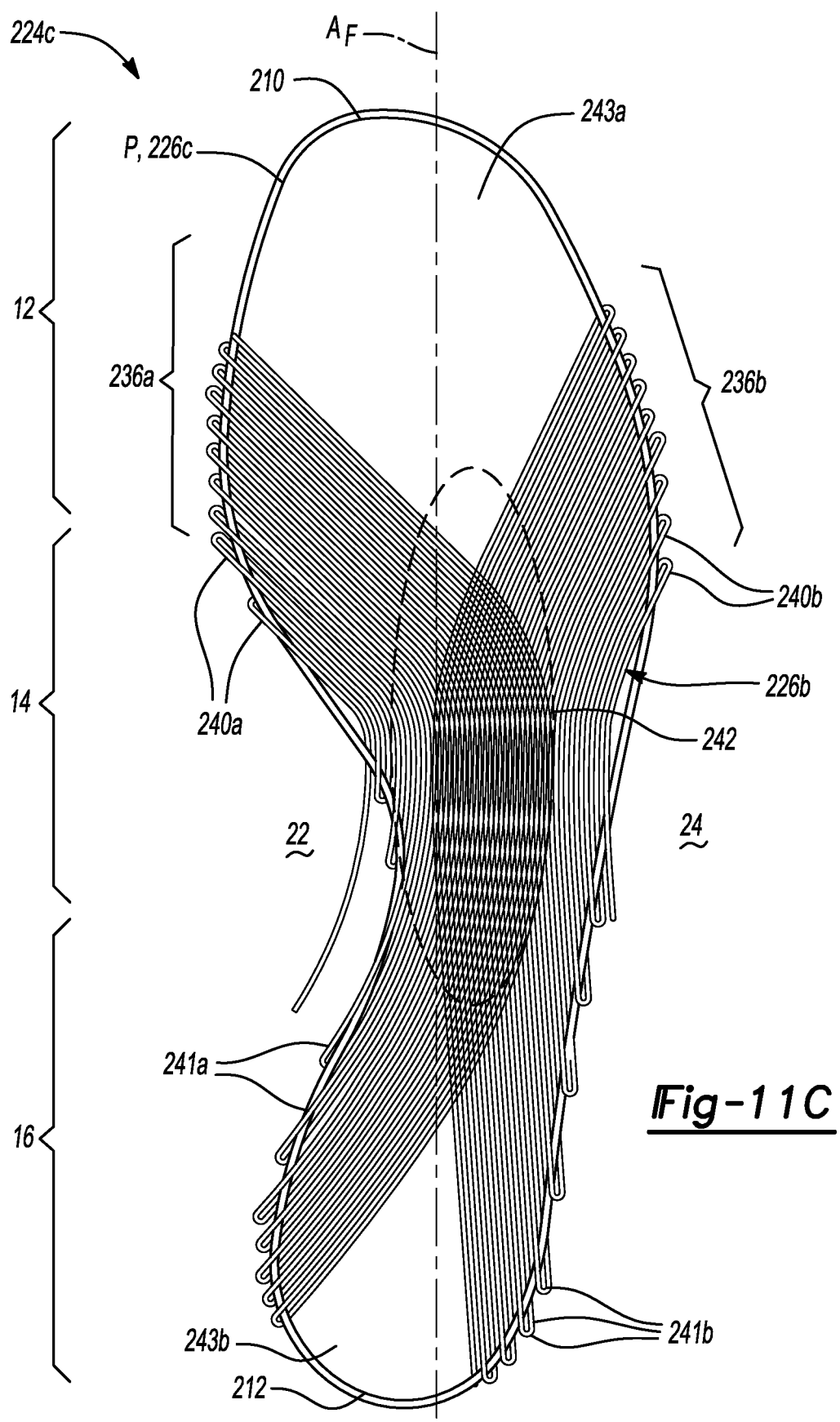

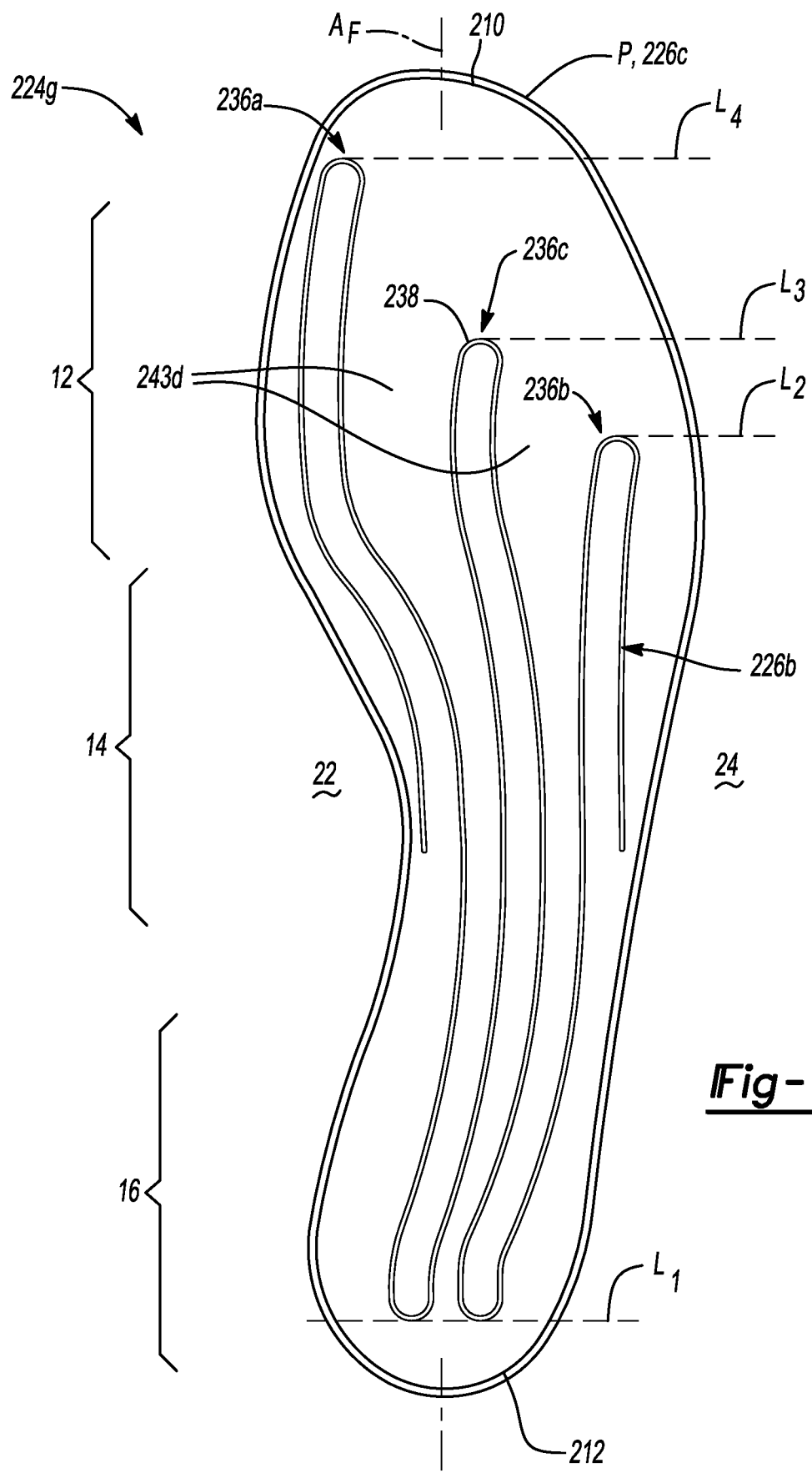

OUTSOLE PLATE

CROSS REFERENCE TO RELATED APPLICATIONS

This non-provisional U.S. Patent Application claims priority under 35 U.S.C. § 119(e) to U.S. Provisional Patent Application Ser. No. 62/658,195, filed Apr. 16, 2018, the disclosure of which is hereby incorporated by reference in its entirety.

TECHNICAL FIELD

The present disclosure relates to articles of footwear including sole structures incorporating outsole plates.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may include an outsole plate formed of a rigid or semi-rigid material that provides rigidity and energy distribution across the sole structure. The outsole may be provided with one or more types of traction elements for maximizing engagement with a ground surface. In some cases, the traction elements may be fixed to the outsole plate. Alternatively, the traction elements may be interchangeable and/or may be formed from rubber or other materials that impart durability and wear-resistance, as well as enhancing traction with the ground surface.

DRAWINGS

The drawings described herein are for illustrative purposes only of selected configurations and are not intended to limit the scope of the present disclosure.

FIG. 5A is a cross-sectional view of the outsole of FIG. 4, taken along section line 5-5 of FIG. 4 and showing the outsole in an unmolded first state;

FIG. 5B is a cross-sectional view of the outsole of FIG. 4, taken along section line 5-5 of FIG. 4 and showing the outsole in a molded second state;

FIG. 6A is an enlarged fragmentary view of the outsole plate of FIG. 5A, taken at area 6A of FIG. 5A;

FIGS. 9A-9E are views of various examples of arrangements of fiber strands used in forming support plies of the outsole of FIG. 4;

Figure 4:
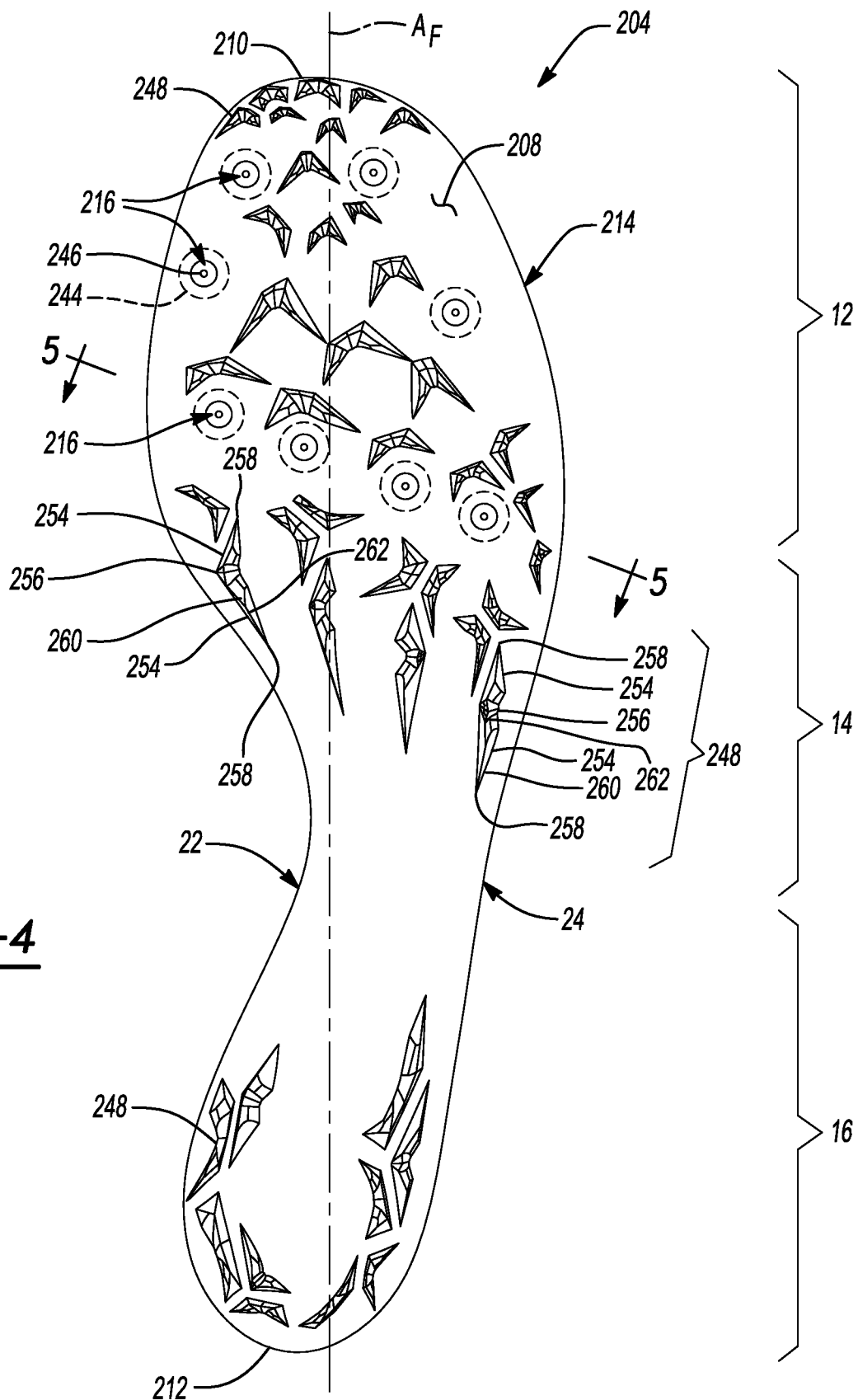
FIG. 4 is a bottom plan view of an outsole in accordance with principles of the present disclosure.
Figure 13A:
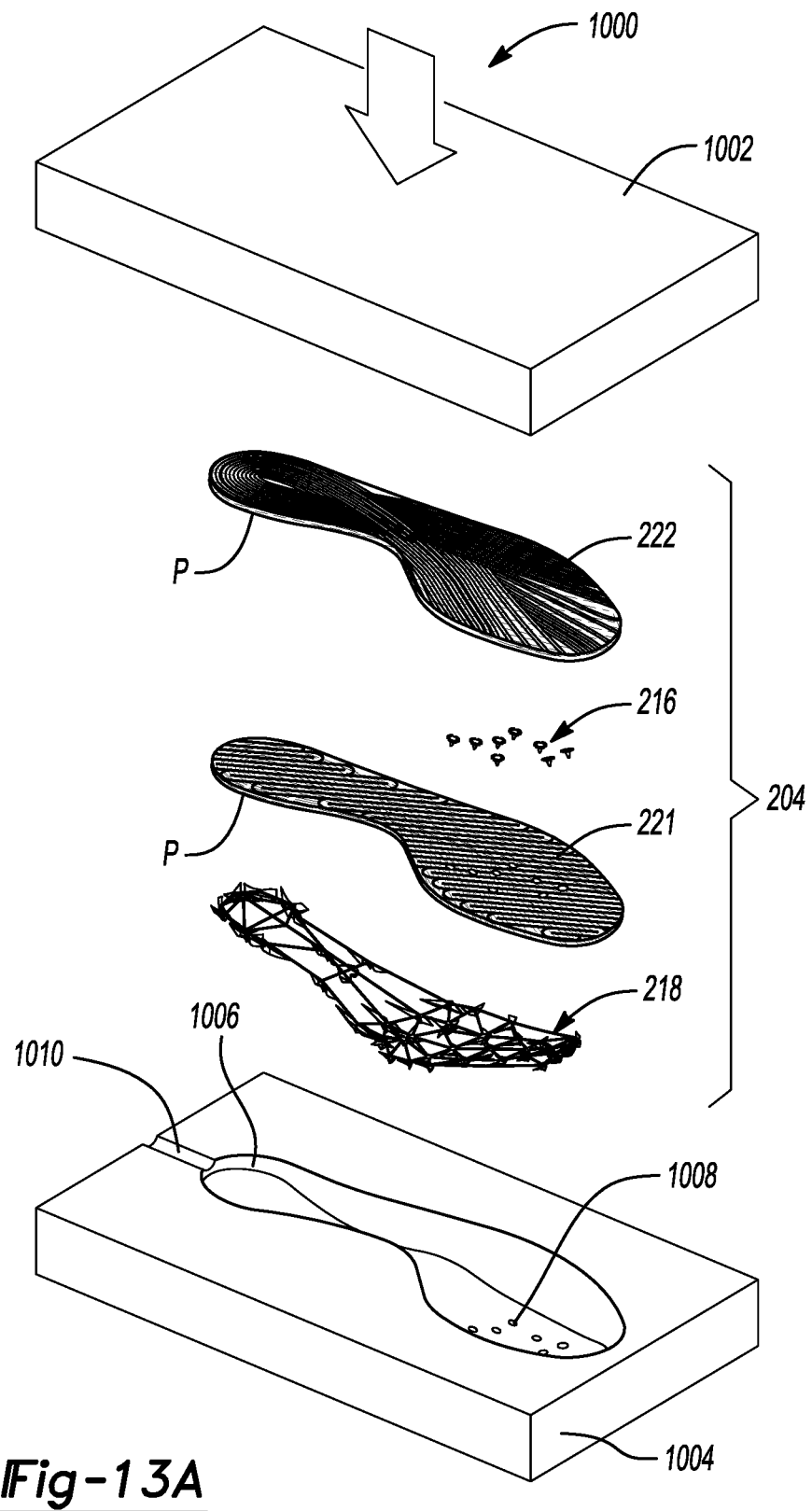
Figure 13B:
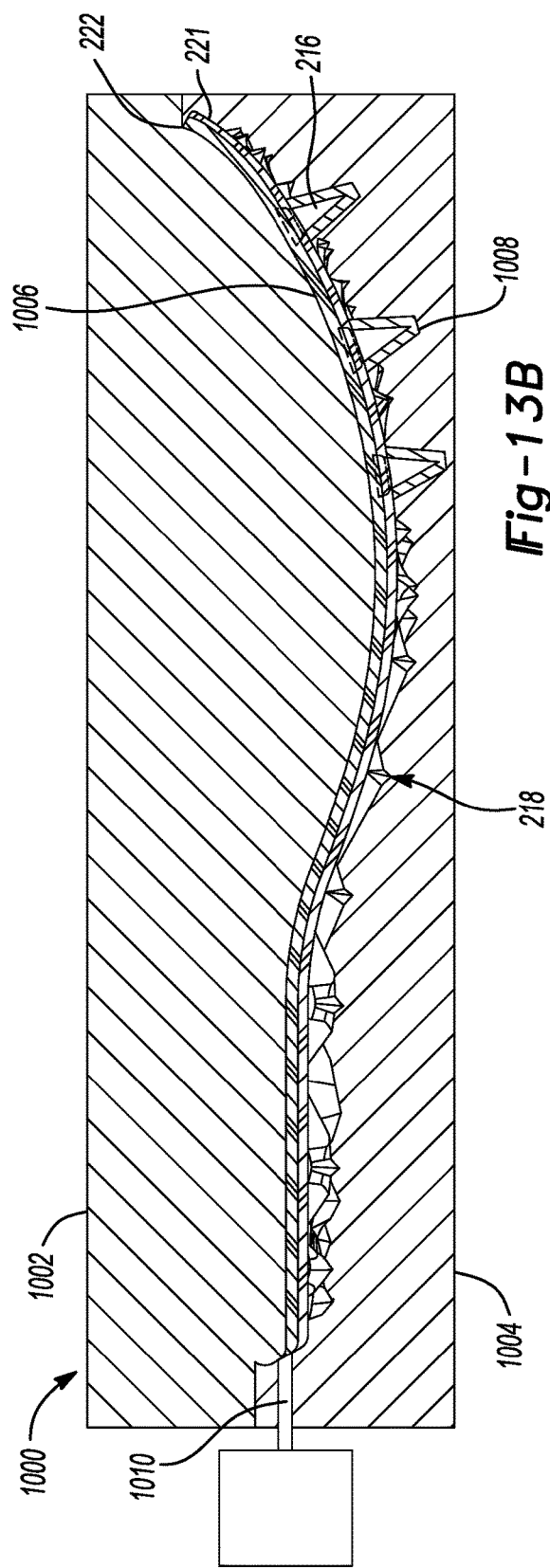
Figure 13C:
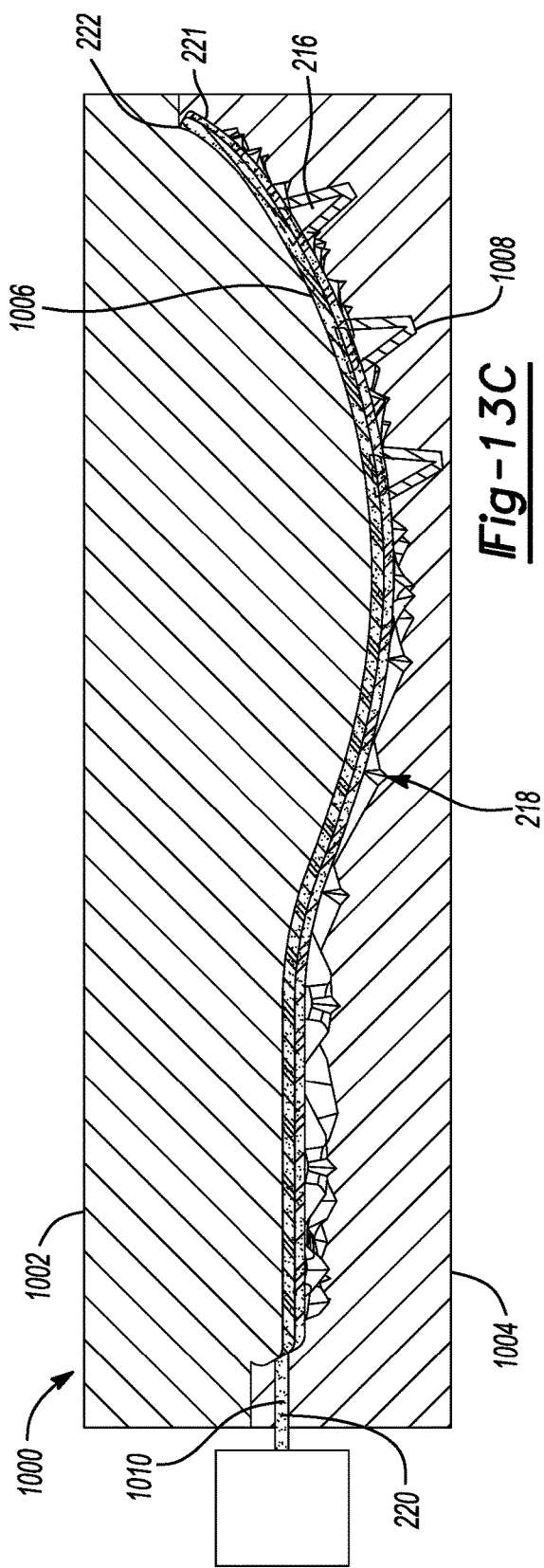
Figure 13D:
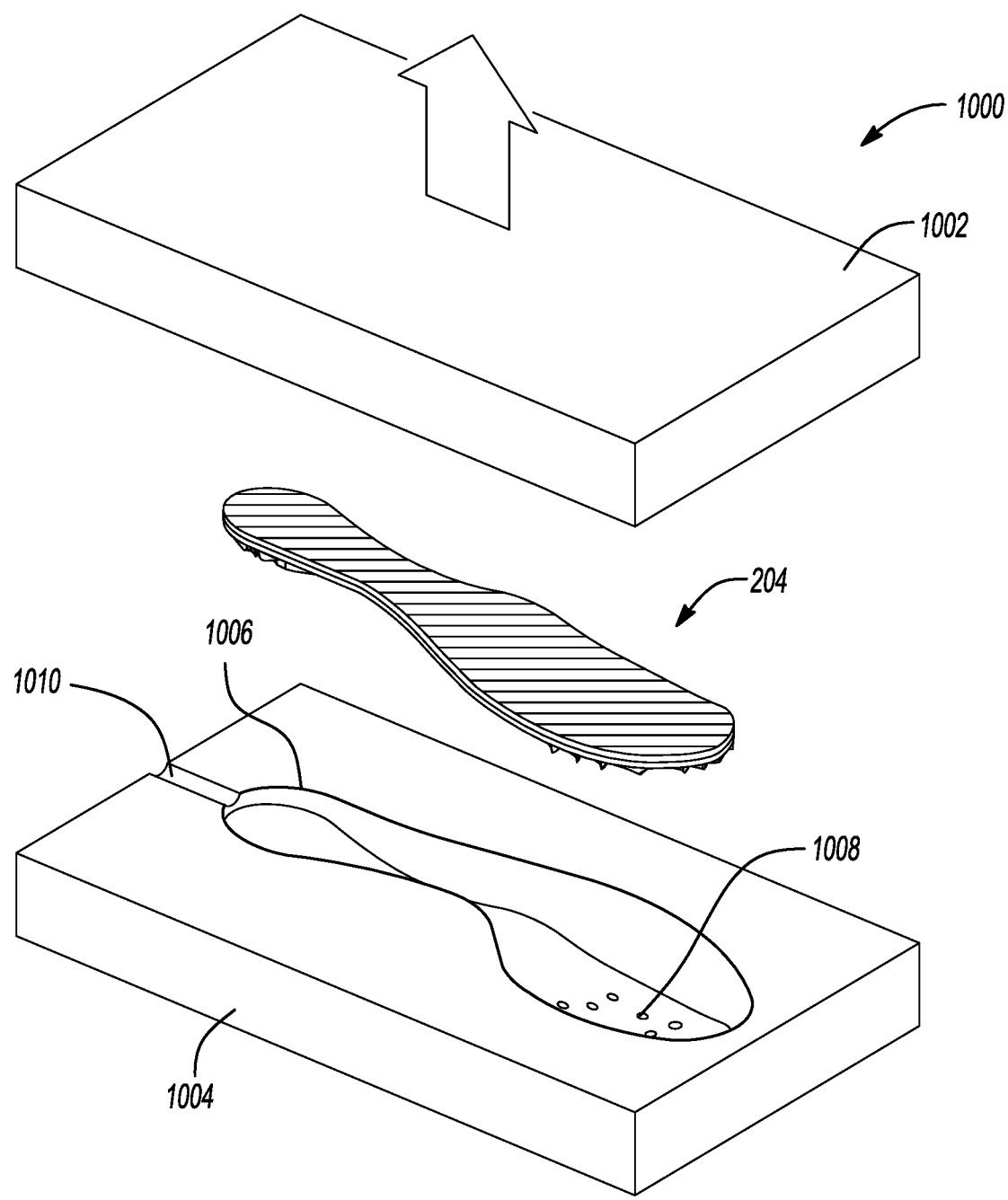

FIG. 11A-G are plan views of various examples of arrangements of fiber strands used in forming torsion plies of the outsole of FIG. 4;

FIG. 12A-12F are perspective views of various examples of a ground-engaging assembly of an outsole plate in accordance with the principles of the present disclosure;

FIG. 13A is a perspective view of a mold for use in forming an outsole plate in accordance with the principles of the present disclosure, the mold shown in conjunction with a stack of outsole plate components prior to being assembled into an outsole plate;

FIG. 13B is a cross-section view of the mold of FIG. 13A, the mold shown in conjunction with a stack of outsole plate components enclosed within a mold cavity prior to a resin curing step;

FIG. 13C is a cross-section view of the mold of FIG. 13A, the mold shown in conjunction with a stack of fibers enclosed within a mold cavity after a resin curing step; and FIG. 13D is a perspective view of the mold of FIG. 13A, the mold shown in conjunction with a formed outsole plate.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a sole structure for an article of footwear. The sole structure includes a component including a first bundle of fibers affixed to a substrate, a ground-engaging assembly including a first traction element, a second traction element, and a connecting member extending between and connecting the first traction element and the second traction element. The sole structure further includes a resin consolidating the first bundle of fibers and entrapping the connecting member to fix a position of the first traction element, the second traction element, and the connecting member relative to the substrate.

Implementations of the disclosure may include one or more of the following optional features. In some examples, at least a portion of the connecting member is entangled in the first bundle of fibers.

In some implementations, at least one of the first traction element, the second traction element, and the connecting member includes a projection extending in a direction toward the substrate. Here, the projection may be entangled in the fibers of the first bundle of fibers. In some examples, the projection includes a retention feature operable to engage the fibers of the first bundle of fibers. The retention feature may include at least one arm extending from a shaft, the shaft being received by and extending at least partially into the fibers of the first bundle of fibers. The least one arm may be formed substantially perpendicular to the shaft. Alternatively, the at least one arm is formed at an acute angle relative to the shaft. The at least one arm may extend from the shaft in a direction away from the substrate. In some examples, the shaft extends through a thickness of the first bundle of fibers.

In some examples, the connecting member is at least partially covered by the resin.

In some configurations, the sole structure includes a third traction element attached to at least one of the first traction element and the second traction element by at least one additional connecting member.

In some examples, the first traction element and the second traction element are formed from nylon.

In some implementations the first bundle of fibers includes at least one of carbon fibers, boron fibers, glass fibers, and polymeric fibers.

In some configurations, the first bundle of fibers is stitched to the substrate via stitching. Here, the first bundle of fibers includes first fibers comingled with second fibers, the second fibers including at least one of a different length, thickness, melting temperature, and Young's modulus than the first fibers. At least one of the stitching, the substrate, the first fibers, and the second fibers may comprise a thermoplastic material.

In some examples, at least one of the fibers of the first bundle of fibers and the substrate comprise a thermoplastic material.

In some implementations, the resin is a polymeric resin.

The sole structure including any of the aforementioned features may be incorporated into an article of footwear. Here, the first traction element and the second traction element form a portion of a ground-engaging surface of the article of footwear.

Another aspect of the disclosure provides a method of forming a sole structure for an article of footwear. The method includes attaching a first bundle of fibers to a flexible substrate, forming a ground-engaging assembly including a first traction element, a second traction element, and a connecting member extending between and connecting the first traction element and the second traction element, consolidating the first bundle of fibers with resin, and entrapping the connecting member with the resin to fix a position of the first traction element, the second traction element, and the connecting member relative to the substrate.

Implementations of the disclosure may include one or more of the following optional features. In some examples, the method includes entangling at least a portion of the connecting member in the first bundle of fibers.

In other implementations, the method further includes providing at least one of the first traction element, the second traction element, and the connecting member with a projection that extends in a direction toward the substrate. Here, the method includes entangling the projection in the fibers of the first bundle of fibers. In some examples, the method includes providing at least one of the first traction element, the second traction element, and the connecting member with a projection includes providing a projection having a retention feature operable to engage the fibers of the first bundle of fibers. Here, providing a projection having a retention feature may include providing a retention feature having at least one arm extending from a shaft, the shaft being received by and extending at least partially into the fibers of the first bundle of fibers. Optionally, the method may include forming the at least one arm substantially perpendicular to the shaft. In some examples, the method includes forming the at least one arm at an acute angle relative to the shaft. Alternatively, the method includes forming the at least one arm from the shaft in a direction away from the substrate. The method may further include extending the shaft through a thickness of the first bundle of fibers.

In some examples, the method includes at least partially covering the connecting member with the resin.

In some implementations, the method includes providing the ground-engaging assembly with a third traction element attached to at least one of the first traction element and the second traction element by at least one additional connecting member.

In some examples, the method includes forming the first traction element and the second traction element from nylon.

In some examples, attaching a first bundle of fibers to a flexible substrate includes attaching a first bundle of fibers including at least one of carbon fibers, boron fibers, glass fibers, and polymeric fibers.

Optionally, the method includes stitching the first bundle of fibers to the substrate via stitching. Attaching a first bundle of fibers to a flexible substrate includes attaching a first bundle of fibers including first fibers comingled with second fibers, the second fibers including at least one of a different length, thickness, melting temperature, and Young's modulus than the first fibers. The method may include forming at least one of the stitching, the substrate, the first fibers, and the second fibers from a thermoplastic material.

In some implementations, the method includes forming at least one of the fibers of the first bundle of fibers and the substrate from a thermoplastic material.

In some examples, consolidating the first bundle of fibers with resin includes consolidating the first bundle of fibers with a polymeric resin.

In some configurations, the method may include incorporating the sole structure of any of the preceding claims into an article of footwear. Here, the method may include forming a portion of a ground-engaging surface of the article of footwear with the first traction element and the second traction element.

In some examples, forming a ground-engaging assembly including a first traction element, a second traction element, and a connecting member includes forming the first traction element, the second traction element, and the connecting member using additive manufacturing.

In some examples, the method includes forming a ground-engaging assembly including a first traction element, a second traction element, and a connecting member includes forming the first traction element, the second traction element, and the connecting member via three-dimensional (3D) printing.

The method may further include inserting the ground-engaging assembly into a first mold portion. Here, inserting the ground-engaging assembly into the first mold portion includes inserting at least one of the first traction element, the second traction element, and the connecting member into a recess of the first mold portion. The method may also include positioning the first bundle of fibers in contact with the ground-engaging assembly within the first mold portion. In some examples, the method includes compression molding the first bundle of fibers and the ground-engaging assembly to form the sole structure.

In some examples, consolidating the first bundle of fibers with resin includes consolidating the first bundle of fibers with thermoplastic resin comingled with the first bundle of fibers. Here the method may include applying heat to the first bundle of fibers to cause the thermoplastic resin to flow.

Another aspect of the disclosure includes sole structure for an article of footwear. The sole structure is formed by a process comprising the steps of attaching a first bundle of fibers to a flexible substrate, forming a ground-engaging assembly including a first traction element, a second traction element, and a connecting member extending between and connecting the first traction element and the second traction element, consolidating the first bundle of fibers with resin, and entrapping the connecting member with the resin to fix a position of the first traction element, the second traction element, and the connecting member relative to the substrate.

Implementations of the disclosure may include one or more of the following optional features. In some examples least a portion of the connecting member is entangled in the first bundle of fibers.

In some implementations, at least one of the first traction element, the second traction element, and the connecting member includes a projection extending in a direction toward the substrate. Here, the projection is entangled in the fibers of the first bundle of fibers. Optionally, the projection may include a retention feature operable to engage the fibers of the first bundle of fibers. In some examples, the retention feature includes at least one arm extending from a shaft, the shaft being received by and extending at least partially into the fibers of the first bundle of fibers. The at least one arm may be formed substantially perpendicular to the shaft. In some examples, the at least one arm is formed at an acute angle relative to the shaft. In some configurations, the at least one arm extends from the shaft in a direction away from the substrate. Optionally, the shaft extends through a thickness of the first bundle of fibers.

In some implementations, the connecting member is at least partially covered by the resin.

In some examples, a third traction element may be attached to at least one of the first traction element and the second traction element by at least one additional connecting member.

In some configurations, the first traction element and the second traction element are formed from nylon.

In some examples, the first bundle of fibers includes at least one of carbon fibers, boron fibers, glass fibers, and polymeric fibers. In some implementations, the first bundle of fibers is stitched to the substrate via stitching. Here, the first bundle of fibers includes first fibers comingled with second fibers, the second fibers including at least one of a different length, thickness, melting temperature, and Young's modulus than the first fibers. At least one of the stitching, the substrate, the first fibers, and the second fibers may include a thermoplastic material.

In some examples, at least one of the fibers of the first bundle of fibers and the substrate comprise a thermoplastic material. The resin of the sole structure may be polymeric resin.

Some aspects of the disclosure provides an article of footwear incorporating the sole structure of any of the preceding paragraphs. Here, the first traction element and the second traction element form a portion of a ground-engaging surface of the article of footwear.

Figure 1:
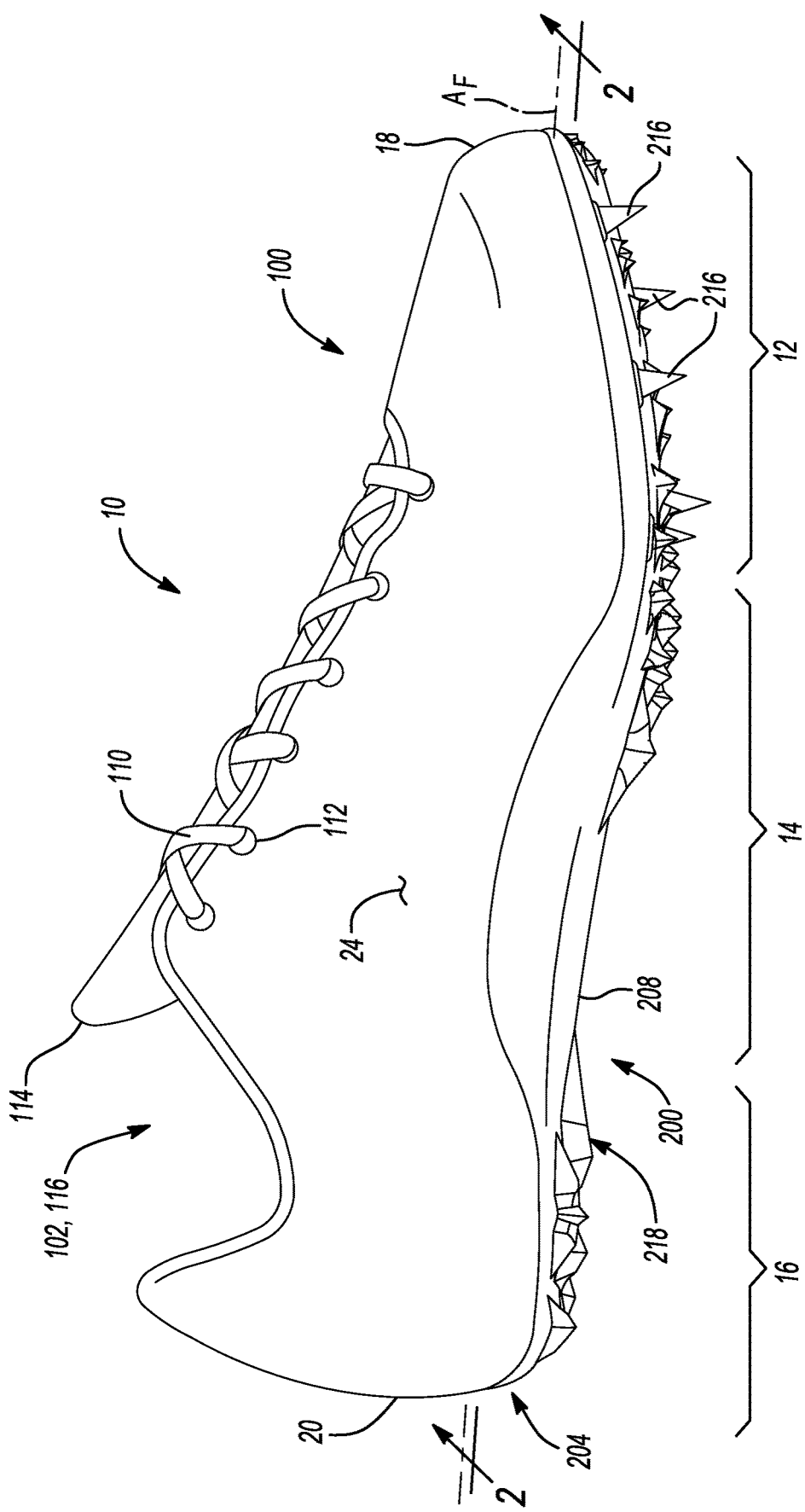
FIG. 1 is a side elevation view of an article of footwear in accordance with principles of the present disclosure.
Figure 2:
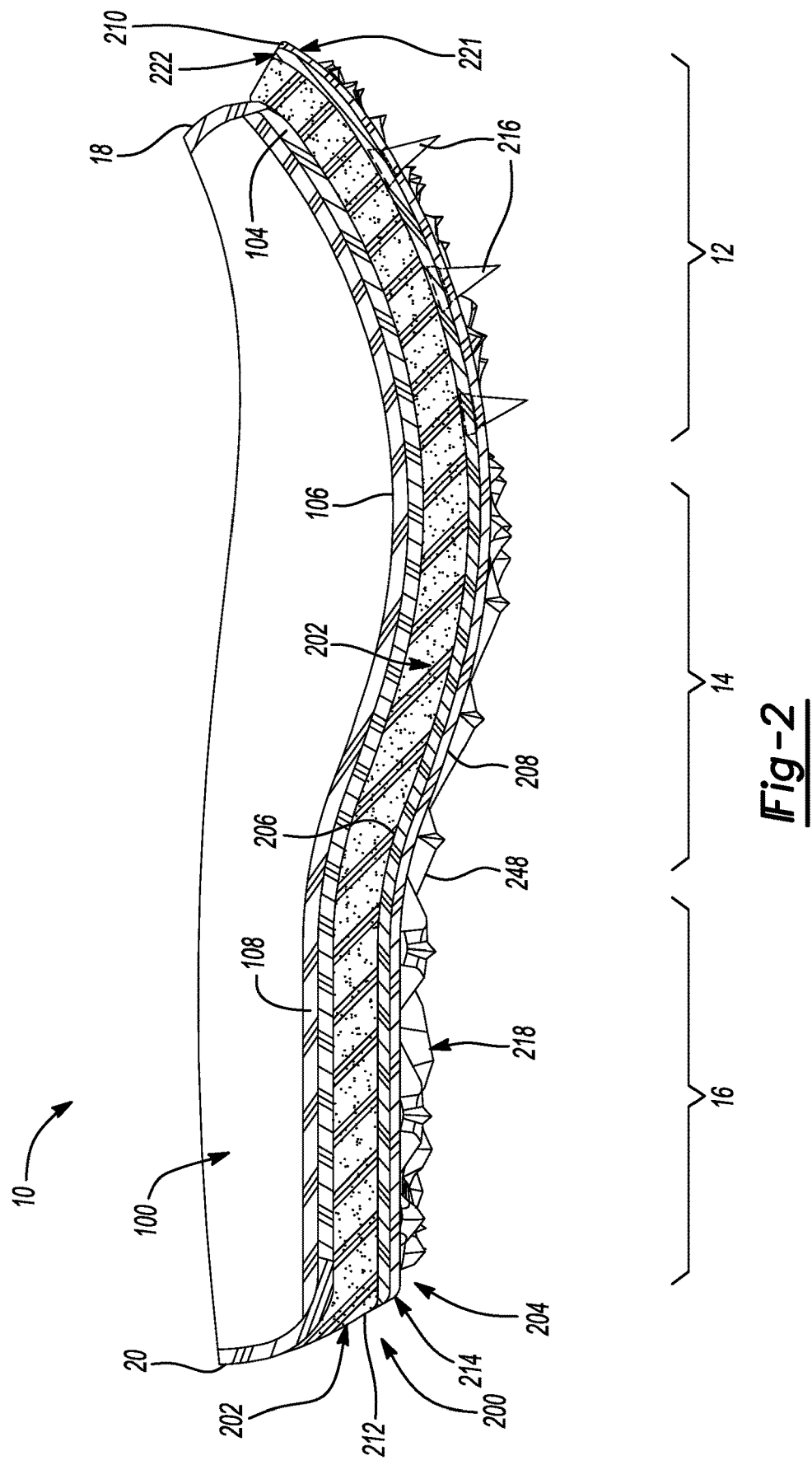
FIG. 2 is a cross-sectional view of the article of footwear of FIG. 1, taken along section line 2-2 of FIG. 1.
Figure 3:
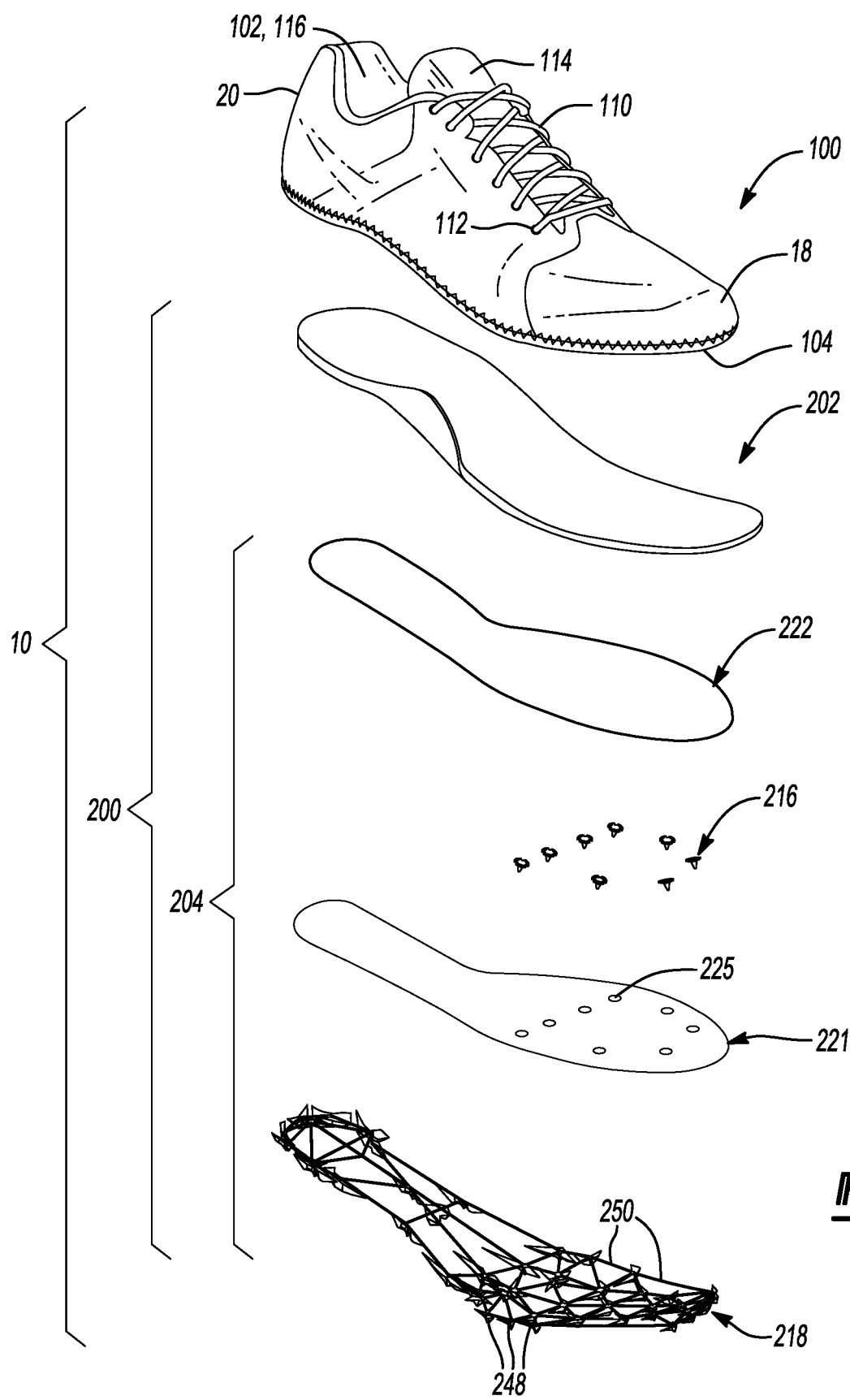
FIG. 3 is an exploded view of the article of footwear of FIG. 1 showing an upper, a midsole, and an outsole.

Referring to FIGS. 1-3, an article of footwear 10 includes an upper 100 and sole structure 200. The article of footwear 10 may be divided into one or more regions. The regions may include a forefoot region 12, a mid-foot region 14, and a heel region 16. The forefoot region 12 may be subdivided into a toe portion corresponding with phalanges, and a ball portion associated with metatarsal bones of a foot. The mid-foot region 14 may correspond with an arch area of the foot, and the heel region 16 may correspond with rear portions of the foot, including a calcaneus bone. The footwear 10 may further include an anterior end 18 associated with a forward-most point of the forefoot region 12, and a posterior end 20 corresponding to a rearward-most point of the heel region 16. A longitudinal axis $A_F$ of the footwear 10 extends along a length of the footwear 10 from the anterior end 18 to the posterior end 20, and generally divides the footwear 10 into a medial side 22 and a lateral side 24. Accordingly, the medial side 22 and the lateral side 24 respectively correspond with opposite sides of the footwear 10 and extend through the regions 12, 14, 16.

The upper 100 includes interior surfaces that define an interior void 102 configured to receive and secure a foot for support on sole structure 200. The upper 100 may be formed from one or more materials that are stitched or adhesively bonded together to form the interior void 102. Suitable materials of the upper may include, but are not limited to, mesh, textiles, foam, leather, and synthetic leather. The materials may be selected and located to impart properties of durability, air-permeability, wear-resistance, flexibility, and comfort.

In some examples, one or more fasteners 110 extend along the upper 100 to adjust a fit of the interior void 102 around the foot and to accommodate entry and removal of the foot therefrom. The upper 100 may include apertures 112 such as eyelets and/or other engagement features such as fabric or mesh loops that receive the fasteners 110. The fasteners 110 may include laces, straps, cords, hook-and-loop, or any other suitable type of fastener. The upper 100 may include a tongue portion 114 that extends between the interior void 102 and the fasteners.

With reference to FIGS. 2 and 3, in some examples the upper 100 includes a strobel 104 having a bottom surface opposing the sole structure 200 and top surface formed on an opposite side from the bottom surface and defining a footbed 106 of the interior void 102. Stitching or adhesives may secure the strobel to the upper 100. The footbed 106 may be contoured to conform to a profile of the bottom surface (e.g., plantar) of the foot. Optionally, the upper 100 may also incorporate additional layers such as an insole 108 or sockliner that may be disposed upon the strobel 104 and reside within the interior void 102 of the upper 100 to receive a plantar surface of the foot to enhance the comfort of the article of footwear 10. An ankle opening 116 in the heel region 16 may provide access to the interior void 102. For example, the ankle opening 116 may receive a foot to secure the foot within the interior void 102 and to facilitate entry and removal of the foot from and to the interior void 102.

With reference to FIGS. 2 and 3, the sole structure includes a midsole 202 and an outsole 204. Generally, the midsole 202 is disposed intermediate the outsole 204 and the upper 100, and is configured to attenuate forces associated with impact of the sole structure 200 with a ground surface. The midsole 202 may extend fully or partially along a length of the footwear 10. In some examples the midsole 202 may be fragmentary, such that a plurality of midsole segments are distributed along the sole structure 200. Stitching or adhesives may secure the midsole 202 to the upper 100.

The midsole 202 may be formed from any suitable materials that compress resiliently under applied loads. Examples of suitable polymer materials for the foam materials include ethylene vinyl acetate (EVA) copolymers, polyurethanes, polyethers, and olefin block copolymers. The foam can also include a single polymeric material or a blend of two or more polymeric materials including a polyether block amide (PEBA) copolymer, the EVA copolymer, a thermoplastic polyurethane (TPU), and/or the olefin block copolymer.

The outsole 204 includes an upper surface 206 and a ground-engaging surface 208 formed on an opposite side from the upper surface 206. The outsole 204 is a full-length outsole 204, and extends continuously from a first end 210 at the anterior end 18 of the footwear 10 to a second end 212 at the posterior end 20, and from the medial side 22 to the lateral side 24.

With reference the FIGS. 2-6B, components of the outsole 204 include an outsole plate 214, one or more first traction elements 216, and a webbed ground-engaging assembly 218. As discussed in greater detail below, the outsole 204 is formed by joining each of the components 214, 216, 218 together using a curable resin 220. For example, the outsole plate 214, the first traction elements 216, and the ground-engaging assembly 218 may be disposed within a mold cavity and subjected to a combination of pressure and heat, whereby the resin 220 is delivered to the mold cavity and impregnates and/or encapsulates each the components 214, 216, 218 to form a unitary structure. Accordingly, the outsole plate 214, the first traction elements 216, and the webbed ground-engaging assembly 218 may cooperate to define the ground-engaging surface 208 of the outsole 204.

With reference to FIGS. 2 and 4, the outsole plate 214 extends from the first end 210 to the second end 212. In the illustrated example, the outsole plate 214 is a full-length plate. Accordingly, the first end 210 of the outsole plate 214 is coincident with the anterior end 18 of the footwear 10, while the second end 212 is coincident with the posterior end 20 of the footwear. Alternatively, the outsole plate 214 may be a partial-length plate that extends from the anterior end 18 to an intermediate portion of the footwear 10. Additionally or alternatively, the outsole plate 214 may be fragmentary, and include a plurality of individual segments disposed along the sole structure.

With reference to FIGS. 2-6B, the outsole plate 214 is formed of a one or more layers 221, 222 stacked in series and bonded together by the resin 220. In one example, the outsole plate 214 includes a lower layer 221 and an upper layer 222, as shown in FIGS. 2 and 3. As explained in greater detail below, each of the layers 221, 222 includes at least one ply 223, 224 formed from one or more strands 226, 226a-226c of fibers 227 arranged on substrates 228 in selected patterns to impart stiffness and gradient load paths throughout the outsole plate 214. Each of the lower layer 221 and the upper layer 222 may be formed with various quantities and arrangements of the plies 223, 224 to impart desired torsional properties to the outsole plate 214. Accordingly, the lower layer 221 and the upper layer 222 are generically represented in FIGS. 2 and 3, while examples of configurations of the plies 223, 224 for each of the layers 221, 222 are described below. With continued reference to FIGS. 2 and 3, the lower layer 222 of the outsole plate 214 is provided with preformed apertures 225 for receiving the traction elements 216, as discussed below.

Each strand 226 may refer to a tow of a plurality of fibers 227, a monofilament, yarn, or polymer pre-impregnated tows. As used herein, the term "tow" or "strand" refers to a bundle (i.e., plurality of filaments (e.g., fiber) that may be twisted or untwisted and each tow may be designated a size associated with a number of fibers 227 the corresponding tow contains. For instance, a single strand 226 may range in size from about 1,000 fibers per bundle to about 48,000 fibers per bundle.

In some configurations, the fibers 227 associated with each strand 226 include at least one of carbon fibers, boron fibers, glass fibers, and polymeric or thermoplastic fibers. Fibers 227 such as carbon fibers, aramid fibers, and boron fibers may provide a high Young's modulus while glass fibers (e.g., fiberglass) and polymer fibers (e.g., synthetic fibers) provide a medium modulus. Additionally or alternatively, each strand 226 may be provided with first fibers 227 comingled with second fibers 227, whereby the second fibers 227 have one or more of a different length, thickness, melting temperature, and/or Young's modulus than the first fibers 227. For example, the strand 226 may include a plurality of carbon fibers 227 and a plurality of polymeric resin fibers 227 that, when activated, solidify and hold the carbon fibers 227 in a desired shape and position relative to one another.

As used herein, the substrate 228 refers to any one of a veil, carrier, or backer to which at least one strand 226 of fibers 227 is attached. The substrate 228 may be formed from a thermoset polymeric material or a thermoplastic polymeric material and can be a textile (e.g., knit, woven, or non-woven), an injection molded article, an organosheet, or a thermoformed article.

The strands 226 of fibers 227 forming the plies 223, 224 of each layer 221, 222 may be affixed to the same or separate substrates 228 and embroidered in a layered configuration. If the strands 226 of fibers 227 are applied to separate substrates 228, the individual substrates 228 are stacked on top of one another once each substrate 228 is supplied with a strand 226 of fibers 227. If, on the other hand, only one substrate 228 is utilized in forming the outsole plate 214, a first strand 226 of fibers 227 is applied to the substrate 228 with additional strands 226 of fibers 227 (i.e., layers) being applied on top of the first strand 226. Finally, a single, continuous strand 226 of fibers 227 may be used to form the outsole plate 214, whereby the strand 226 is initially applied and affixed to the substrate 228 and is subsequently layered on top of itself to form a layered construction.

When forming the layers 221, 222 of the outsole plate 214, the strand or strands 226 of the plies 223, 224 may be applied directly to the substrate 228, and may be attached to the substrate 228 using stitching 230 to hold the strands 226 in a desired location. In some examples, the stitching 230 may include a continuous zig-zag stitch extending along the strand. Alternatively, the stitching 230 may be provided at discrete attachment points spaced along the strand 226.

The stitching 230 may be formed from the same material as the substrate 228. Alternatively, the stitching 230 may be formed from a different material than the material forming the substrate 228 such that the stitching 230 is associated with a higher melting point than the substrate 228. Providing the stitching 230 with a higher melting point than the substrate 228 allows the stitching 230 to melt after the substrate 228 when heat is applied during formation of the outsole plate 214. In some examples, the stitching 230, or at least a portion thereof, is formed from a thermoplastic material.

With reference to FIGS. 5A, 6A, 7, and 8, the lower layer 221 of the illustrated example includes a substrate 228, 228a positioned on top of the lower layer 221, a first support ply 223e adjacent to and beneath the substrate 228b, and a second support ply 223c beneath the first support ply 223e. With the illustrated example, both of the support plies 223c, 223e are beneath the substrate 228b and are attached to the substrate 22b8 using a single "pass" of stitching 230, whereby each stitch 230 secures both plies 223c, 223e. However, as discussed above, the first support ply 223e may be stitched to the substrate 228b separately from the second support ply 223c. Further, although support plies 223c, 223e having strands 226 extending transverse to each other are illustrated, any combination of the support plies 223a-223e described below may be used in the lower layer 221.

Referring to FIGS. 9A-9E, several examples of configurations of the support plies 223 are shown. As shown, the support plies 223 of the outsole plate 214 each include at least one support ply strand 226, 226a wound in a uniform serpentine configuration, such that the support ply strands 226a each include a plurality of linear segments 232 arranged in parallel. Each of the segments 232 is straight and is connected to adjacent ones of the segments 232 by loops 234 at each end. In some examples, the support ply strands 226a may be tightly wound, whereby each segment 232 abuts an adjacent one of the segments 232 to provide a substantially continuous layer of the support ply strands 226a. In some examples, the support ply strands 226a may be wound loosely, whereby adjacent segments 232 are separated from each other by a gap (not shown). In some examples, the segments 232 may be equally spaced from each other. However, spacing between segments 232 may be variable, such that some segments are spaced farther apart from each other than others. Additionally, some segments 232 may be spaced apart from each other, while other segments 232 abut each other.

As shown in FIGS. 9A-9E, the segments 232 may extend parallel to or at an oblique angle $\Phi$ to the longitudinal axis $A_F$. For example, a longitudinal axis $A_S$ of the segments 232 may extend at oblique angles to the longitudinal axis $A_F$ ranging from $-30$ degrees ($-30°$) to 30 degrees ($30°$). In one example, the segments 232 may be oriented at +/−30 degrees ($30°$) relative to a longitudinal axis $A_F$ of the article of footwear 10, as shown in FIGS. 9C and 9E. In another example, the segments 232 of the support ply strand 226a may be arranged at an angle $\Phi$ of +/−15 degrees ($15°$) relative to a longitudinal axis $A_F$ of the article of footwear 10, as shown in FIGS. 9B and 9D. Other angles may be selected to impart desired stiffness to the outsole plate 214.

Figure 7:
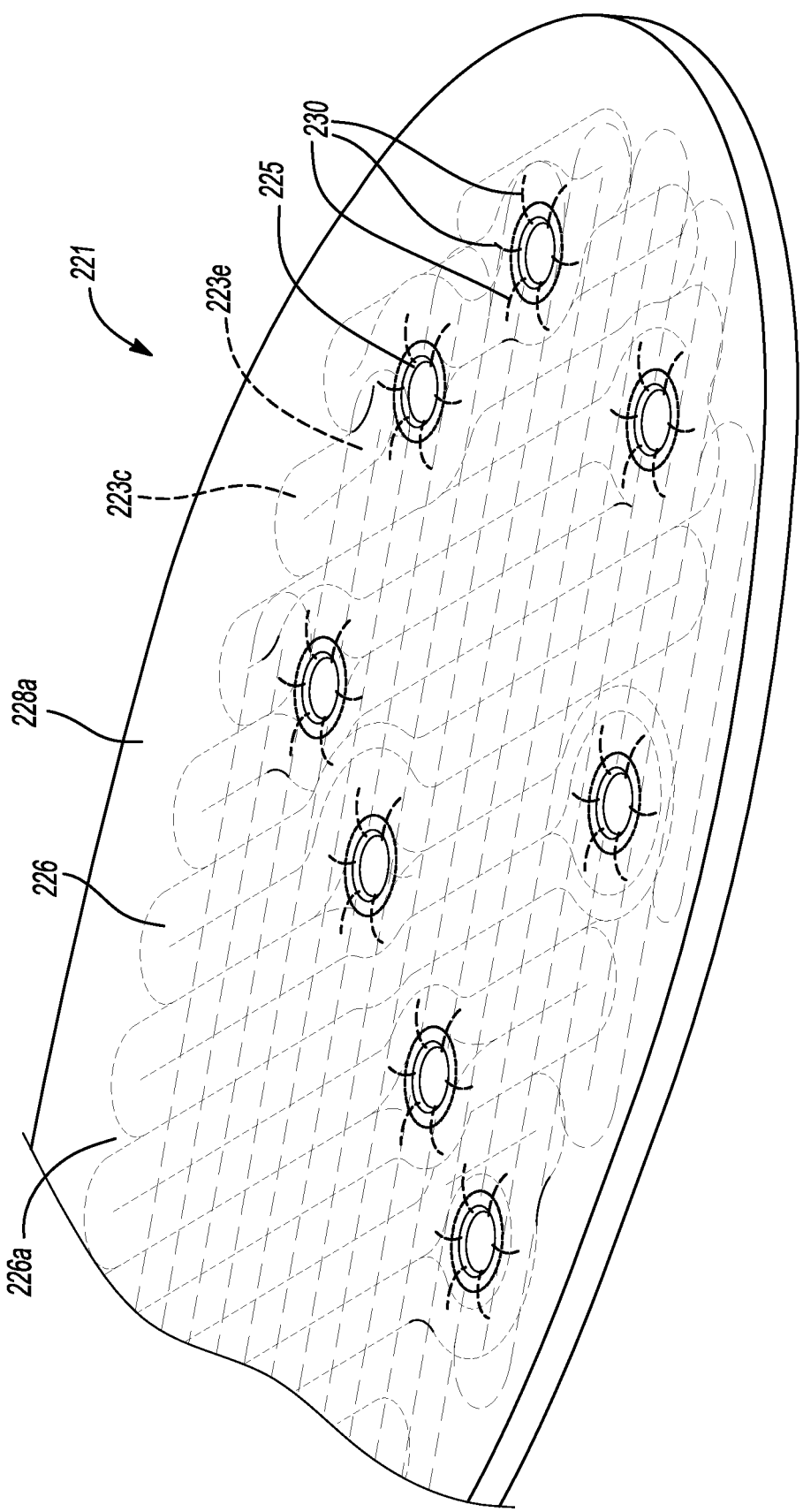
FIG. 7 is an enlarged fragmentary perspective view of a lower layer of an outsole plate in accordance with the principles of the present disclosure.
Figure 8:
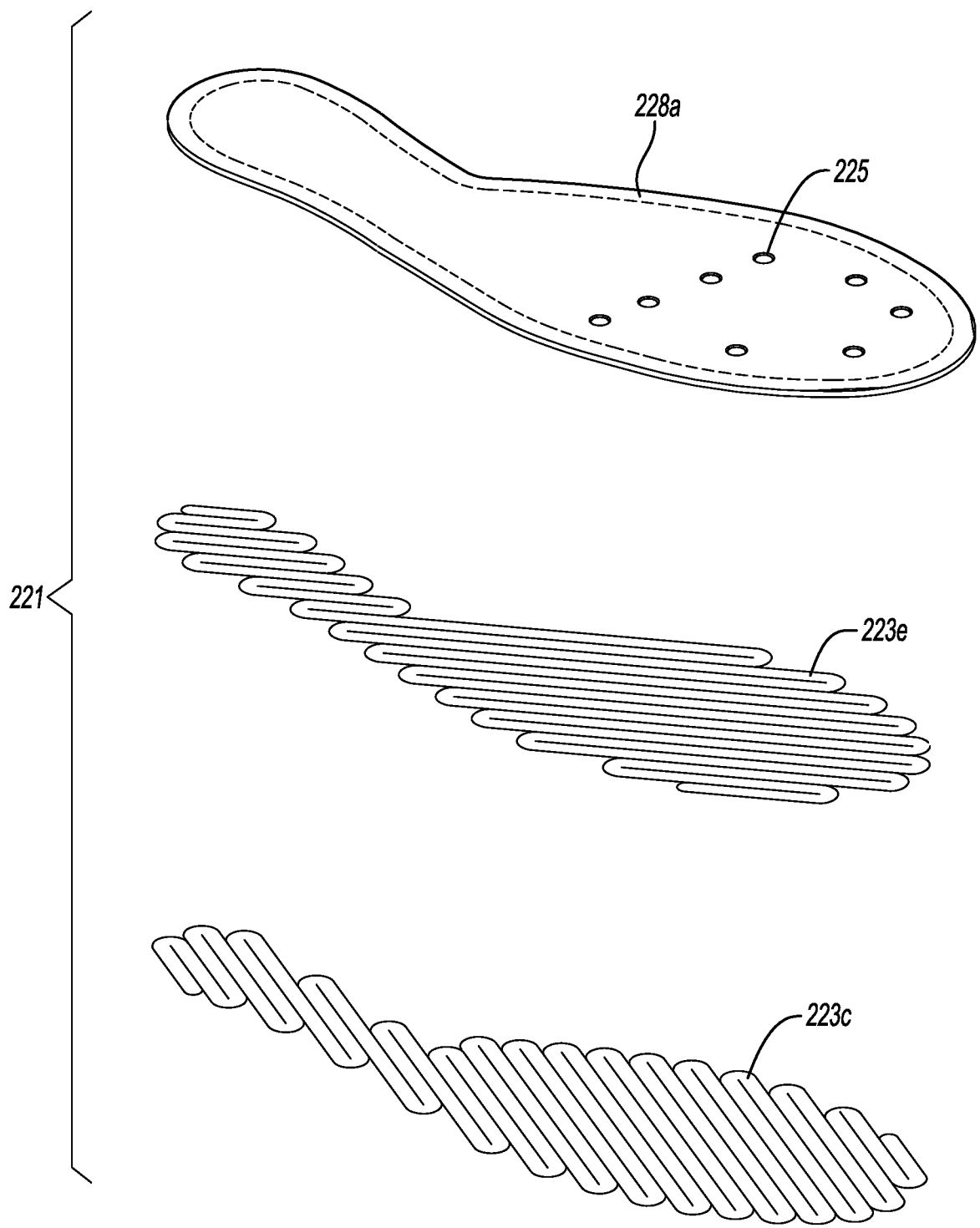
FIG. 8 is an exploded view of a lower layer of an outsole plate in accordance with the principles of the present disclosure.

As introduced above, the lower layer 221 includes a plurality of apertures 225 formed therethrough. Each of the apertures 225 is configured to receive a portion of one of the traction elements 216 therethrough when the components 216, 218, 221, 222 of the outsole plate 214 are assembled prior to molding. As shown in FIG. 7, the apertures 225 may be formed through the substrate 228a and each of the support plies 223. As discussed above, the substrate 228a is formed of a substantially continuous sheet of material. Accordingly, the apertures 225 may be formed in the substrate 228a by material removal methods, such as cutting or punching. Conversely, the apertures 225 are formed through the support plies 223 by stitching adjacent segments 232 of the support ply strands 226a of each support ply 223 to be spaced apart from each other in discrete areas of the lower layer 221. As shown in FIG. 7, the lower layer 221 may include an increased density of stitching 230 around each of the apertures 225 so that the segments 232 follow an arcuate path to define an outer periphery of the aperture 225. Accordingly, a first one of the apertures 225 is defined by (i) an opening that is cut or punched through the material of the substrate 228a, (ii) a first space between two adjacent segments 232 of a support ply strands 226a of a first one of the plies 223, and (iii) a second space between two adjacent support ply strands 226a of a second one of the plies 223, whereby each of the opening, the first space, and the second space are in communication with each other and cooperate to define an uninterrupted passage through the lower layer 221. Additional openings or spaces may be formed where additional substrates 228 or plies 223, 224 are included in the lower layer 221.

Turning now to FIGS. 5A, 6A, and 10-11G, example configurations of the upper layer 222 are provided. In addition to support plies 223 described above, the upper layer 222 of the outsole plate 214 further includes one or more torsion plies 224. Unlike the support plies 223, which have a substantially continuous and homogenous arrangement of adjacently-laid elongate segments 232 of support ply strands 226a, the torsion plies 224 are formed from torsion strands 226b arranged in irregular patterns to impart anisotropic stiffness and gradient load paths throughout the outsole plate 214.

The torsion plies 224 may further include peripheral strands 226c interweaved with the torsion strands 226b along an outer perimeter of the torsion plies 224, whereby the peripheral strands 226c are configured to define an outer peripheral edge P of the torsion plies 224 when the torsion strands 226b are trimmed, as described below. Accordingly, the peripheral strand 226c of each of the torsion plies 224 may advantageously provide a continuous boundary of the outsole plate 214. The continuous peripheral strand 226c provides improved strength along peripheral edge P of the outsole plate 214, and minimizes exposed ends of the trimmed torsion strands 226b.

Figure 10:
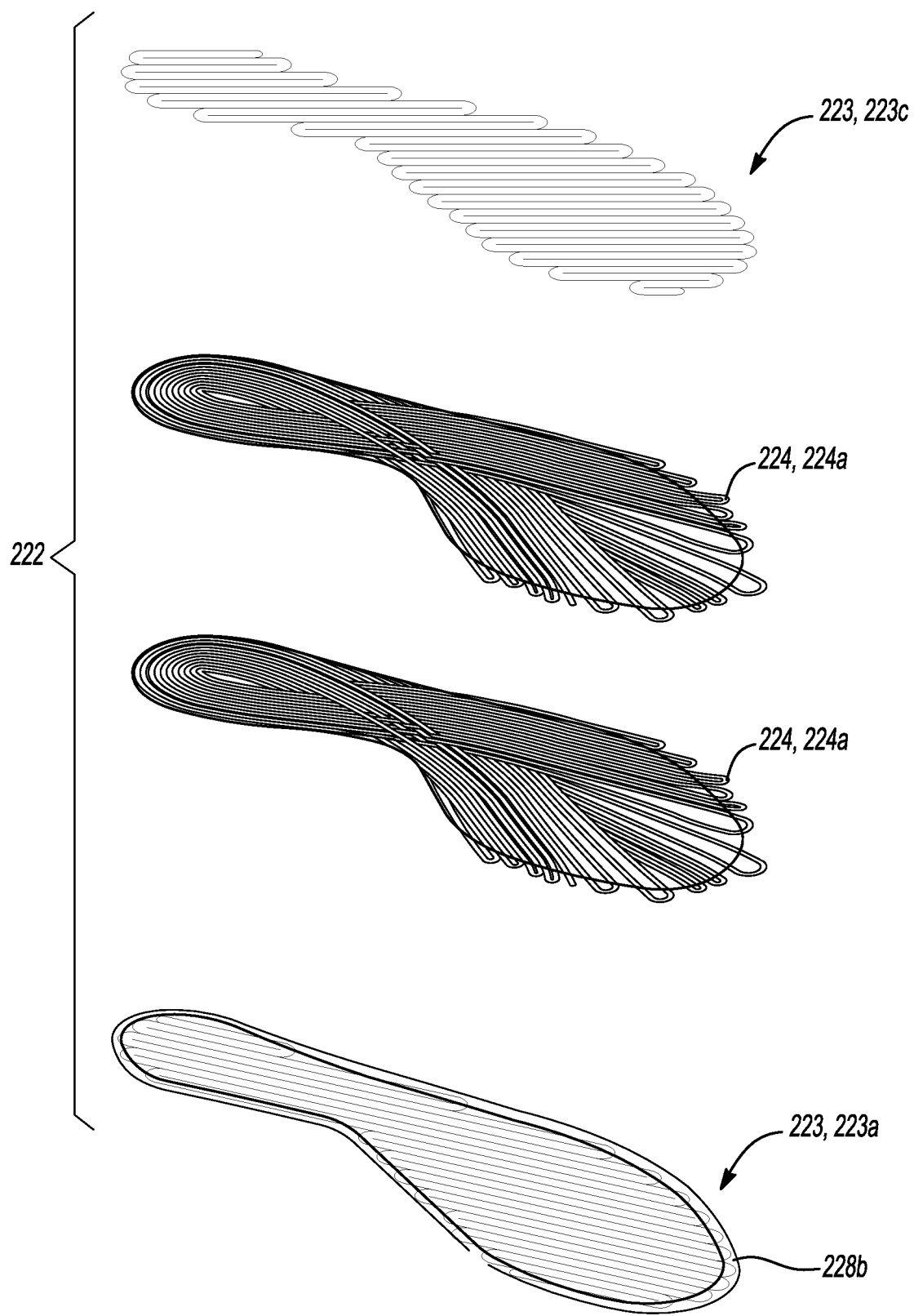
FIG. 10 is an exploded view of an upper layer of an outsole plate in accordance with the principles of the present disclosure.

With reference to FIGS. 5A, 6A, and 10, the upper layer 222 includes one of the substrates 228, 228b defining a base of the upper layer 222 for receiving a plurality of the plies 223, 224. The plies 223, 224 of the upper layer 222 include a first support ply 223, 223c stacked adjacent to the substrate 228b, a pair of torsion plies 224, 224a stacked in series atop the first support ply 223, 223c, and a second support ply 223, 223e disposed on an opposite side of the upper layer 222 from the substrate 228b. Thus, the upper layer 222 is arranged such the torsion plies 224 are interposed between the support plies 223. Although the illustrated upper layer 221 includes two torsion plies 224, 224a having the same configuration, any one of the examples of the torsion plies 224a-224g described below may be used. Additionally or alternatively, different combinations of the torsion plies 224, 224a-224g may be interposed between different combinations of the support plies 223, 223a-223e.

Referring to FIGS. 11A-11G, the torsion plies 224 of the outsole plate 214 each include at least one torsion strand 226, 226b wound in an a non-uniform, serpentine configuration, such that each torsion strand 226b includes a plurality of arcuate segments 236 distributed anisotropically throughout the ply 224, 224a-224g. With reference to FIGS. 11A-11G each of the segments 236 includes arcuate portions and is initially connected to adjacent ones of the segments 236 by loops 238 at each end. Unlike the support plies 223, which have a plurality of linear, uniformly distributed segments, the segments 236 of the torsion plies 224 include arcuate portions, and are variably spaced apart from each other.

The torsion strands 226b of the torsion plies 224 may include a plurality of medial segments 236a, a plurality of lateral segments 236b, and/or a plurality of interior segments 236c. As shown, the segments 236a-236c are generally arranged in a splayed pattern such that an average spacing between the segments 236a-236c is greater in the forefoot region 12 and the heel region 16 than it is in the mid-foot region 14. For instance, in the example of FIGS. 11A-11G, the segments 236a are tightly spaced through the mid-foot region 14, and diverge from each other along a direction from the mid-foot region 14 towards each of the anterior end 18 and the posterior end 20. Due to the spacing between adjacent segments 236a-236c of the torsion strand 226b being closer in the mid-foot region 14 compared to the spacing in the forefoot and heel regions 12, 16, respectively, the segments 236a-236c collectively provide a greater concentration/density of fibers 227 in the mid-foot region 14 compared to the concentration/density of fibers 227 in the forefoot and heel regions 12, 16, respectively. Accordingly, the torsion strands 226b of the torsion plies 224, 224a-224g may provide the outsole plate 214 with a stiffness in the mid-foot region 14 that is greater than the stiffness of the outsole plate 214 in each of the forefoot region 12 and the heel region 16.

As discussed below, the ends 240, 241 of adjacent ones of the segments 236a-236c may be initially connected to each other by loops 238 such that a single torsion strand 226b forms the medial segments 236a, the lateral segments 236b, and the interior segments 236c. In the examples of FIGS. 11A-11D, the torsion strand 226b includes the loops 238 disposed outside a peripheral edge P of the torsion ply 224, 224a for connecting adjacent segments 236a-236c of the torsion strand 226b. As discussed above, the peripheral edge P is defined by a peripheral strand 226c extending along an outer perimeter of the ply 224, 224a. The peripheral strand 226c may be interweaved through the segments 236 of the torsion strand 226b.

To eliminate the presence of pinch points when subjecting the torsion plies 224 to pressure (e.g., molding) to form the outsole plate 214, the torsion strand 226b may be trimmed along the peripheral strand 226c to form a continuous peripheral edge P of the torsion ply 224. With reference to the examples of the torsion plies 224, 224e-224g shown in FIGS. 11E-11G, the torsion strands 226b may be contained within the peripheral edge P of the ply 224, 224e-224g. Here, the loops 238 may be consolidated when the strands 226 and other plies 223, 224 are subjected to heat and pressure to consolidate the fibers 227, and thereby form the outsole plate 214.

Figure 11A:
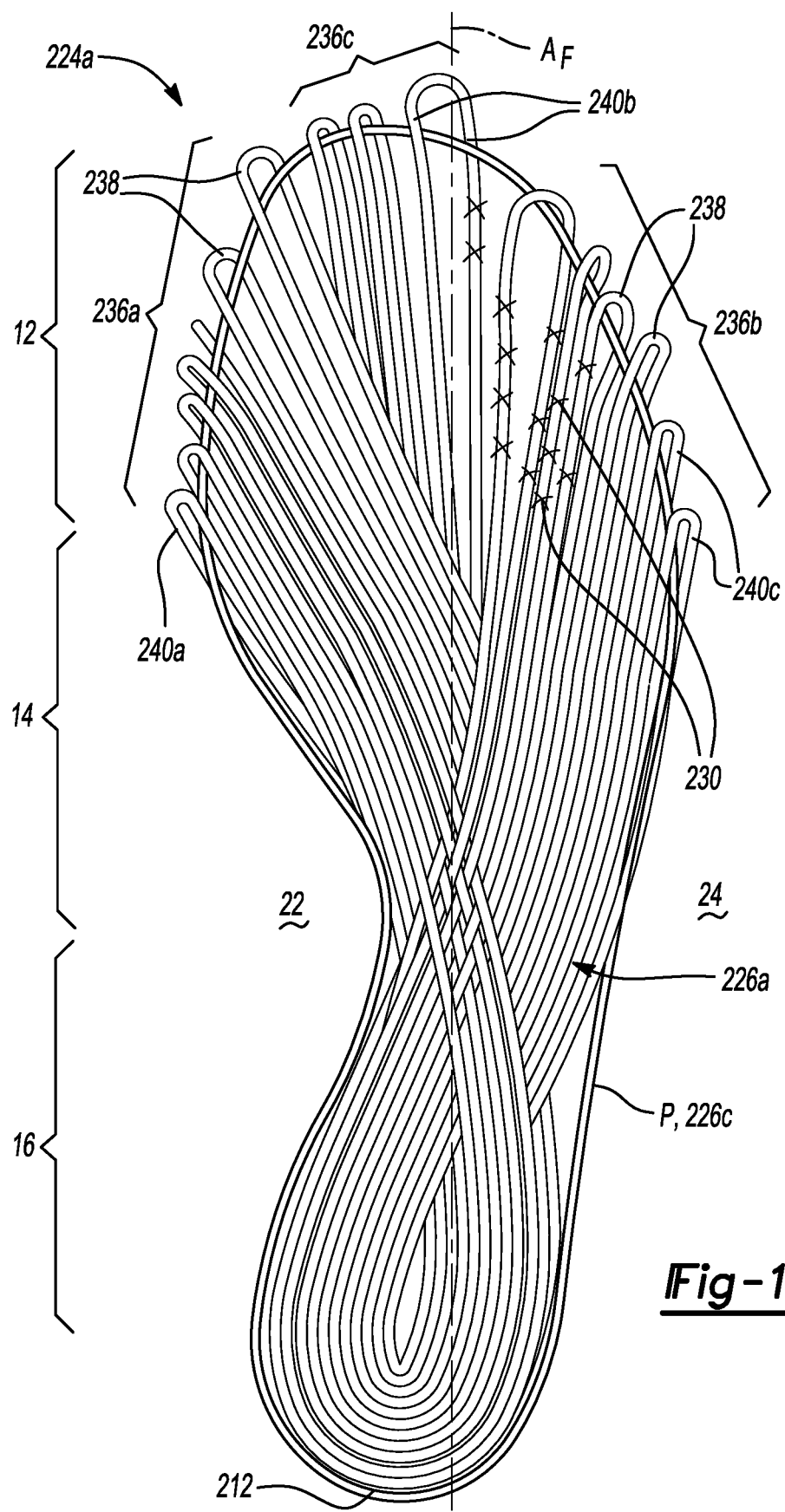

Referring to FIG. 11A, in one example of the torsion ply 224, 224a a torsion strand 226b is wound continuously in an overlapping pattern, whereby a medial segments 236a extend from the medial side 22 in the forefoot region 12 to the lateral side 24 in the heel region 16. Each of the medial segments 236a then wraps around the heel region 16 to the medial side 22, and transitions into a corresponding lateral segment 236b that extends from the medial side 22 in the heel region 16 to the lateral side 24 in the forefoot region 12. As discussed above, each of lateral segments 236b extends beyond the peripheral strand 226c in the forefoot region 12. A loop 238 is formed where the strand lateral segment 236b is turned back towards the peripheral strand 226c to extend back towards the medial side 22 in the heel region 16, around the heel region 16 to the lateral side 24, and back to the medial side 22 in the forefoot region 12, where another loop 238 is formed. This pattern is continued until the segments 236, 236a-236c are distributed along an entirety of the ply 223, 223 from the medial side 22 to the lateral side 24. In some examples, the medial segments 236a, the lateral segments 236b, and the interior segments 236c may alternatingly interweave or overlap each other as the torsion strand 226b is laid, thereby forming a basket weave configuration in the mid foot region 14. Additionally or alternatively, all of the medial segments 236a may be laid above or beneath all of the lateral segments 236b.

Figure 11B:
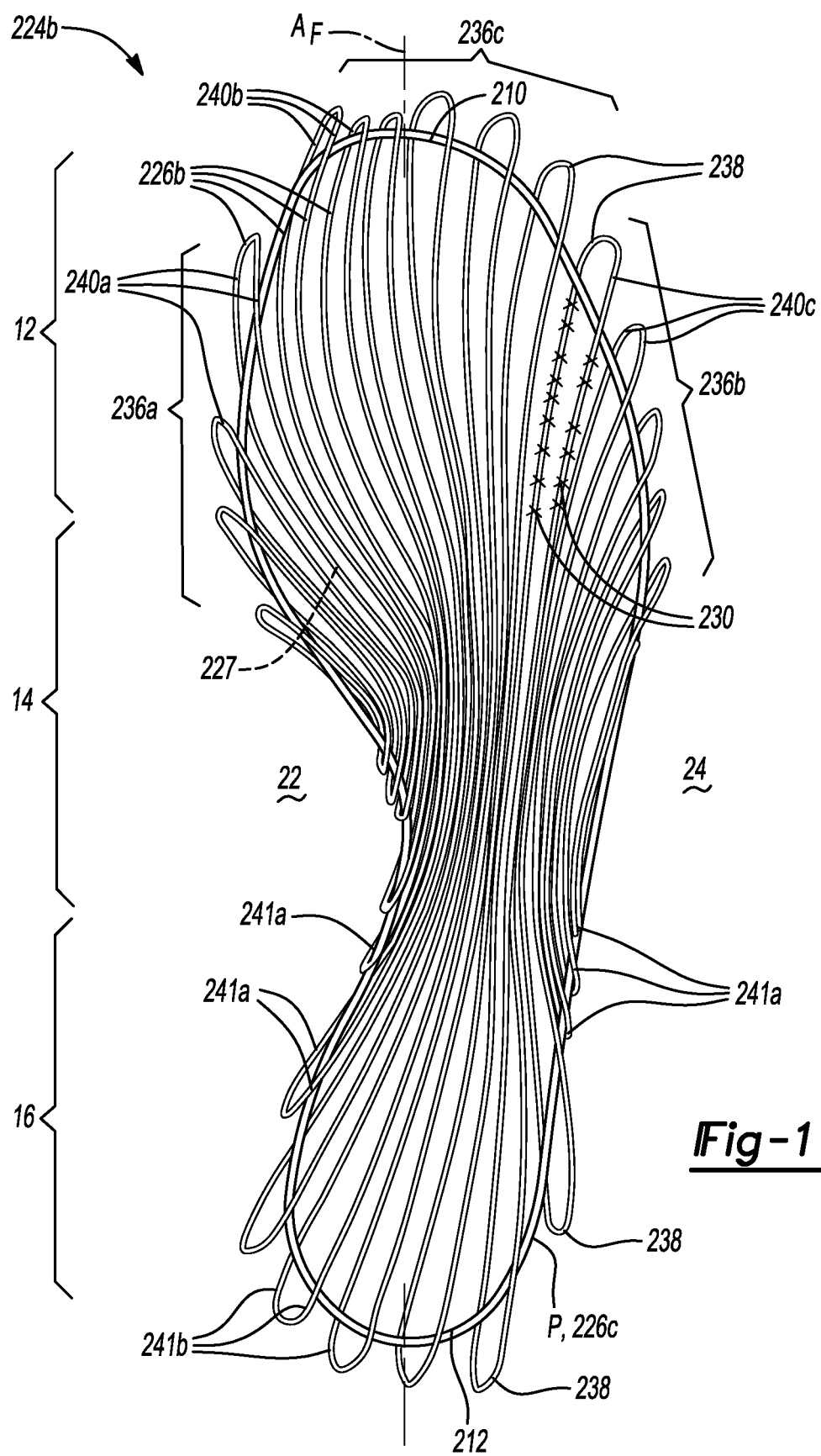

In another example of a torsion ply 224, 224b—shown in FIG. 11B—the torsion strand 226b is arranged such that the segments 236, 236a-236c extend generally along a longitudinal axis $A_F$ of the article of footwear 10. The medial segments 236a are generally disposed on the medial side 22 of the torsion ply 224, 224b and extend from first ends 240a at the medial side 22 in the forefoot region 12 to second ends 241a at the medial side 22 in the heel region 16. One or more of the medial segments 236a have a reverse curve shape, such that each of the medial segments 236a curves towards the lateral side 24 through the forefoot region 12 and curves towards the medial side through the mid-foot region 14 and/or the heel region 16.

The lateral segments 236b are generally disposed on the lateral side 24 of the torsion ply 224b and extend from first ends 240c at the lateral side 24 in the forefoot region 12 to second ends 241c at the medial side 22 in the heel region 16. The lateral segments 236b each extend along a simple or compound curve from the first ends 240c to the second ends 241c. Accordingly, the lateral segments 236b may be described as being "C-shaped."

The interior segments 236c are generally disposed intermediate the medial side 22 and the lateral side 24 and extend from first ends 240b at the anterior end 18 to second ends 241b at the posterior end 20. One or more of the interior segments 236c have a reverse curved shape, such that each of the segments curves towards the lateral side 24 in the forefoot region 12, is substantially straight through the mid-foot region 14, and curves towards the medial side 22 through the heel region 16. Accordingly, the interior segments 236c may be described as being "S-shaped."

Referring to the example of the torsion ply 224, 224c shown in FIG. 11C, the torsion strand 226b may be formed from a continuous strand 226 of fibers 227 or two or more strands 226 of fibers 227. As shown, the torsion strand 226b of the torsion ply 224, 224c includes loops 238 disposed outside the peripheral strand 226c of the ply 224, 224c for connecting adjacent segments 236, 236a, 236b of the torsion strand 226b.

The torsion strand 226b includes a plurality of medial segments 236a and a plurality of lateral segments 236b that interweave or overlap within an interior region 242 of the ply 224c. As shown, the interior region 242 is formed in the midfoot region 14 and is spaced inwardly from each of the medial side 22 and the lateral side 24.

The medial segments 236a may be disposed adjacent and substantially parallel to one another, whereby each medial segment 236a has a length that extends between a first end 240a proximate to the peripheral strand 226c at the medial side 22 in the forefoot region 12, and a second end 241a proximate to the peripheral strand 226c at the lateral side 124 in the heel region 16. The medial segments 236a traverse the ply 224c in the shape of a reverse "C", whereby an intermediate portion of each of the medial segments 236a passes through the interior region 242. Here, the portions of the medial segments 236a in the midfoot region 14 extend in a direction substantially parallel to the longitudinal axis $A_F$ of the article of footwear 10. In some implementations, the spacing between each adjacent medial segment 236a is substantially uniform across the lengths of the medial segments 236a.

On the other hand, each lateral segment 236b has a corresponding length that extends between a first end 240b proximate to the peripheral strand 226c at the lateral side 24 in the forefoot region 12, and a second end 241b proximate to the peripheral strand 226c at the lateral side 24 in the heel region 16. The shape of the lateral segments 236b are inverted relative to the shape of the medial segments 236a, and therefore traverse the ply 224c in the shape of a "C", whereby an intermediate portion of each of the lateral segments 236b passes through the interior region 242. Here, the portions of the lateral segments 236b in the midfoot region 14 extend in a direction substantially parallel to the longitudinal axis $A_F$ of the article of footwear 10.

The medial segments 236a extending into and out of the interior region 242 may cross-cross, overlap, and/or interweave with one or more of the lateral segments 236b extending into and out of the interior region 242. While the spacing between each adjacent medial segment 236a may be substantially uniform across the lengths of the medial segments 236a, each medial segment 236a may be disposed between two corresponding lateral segments 236b in an alternating fashion within the interior region 242. Accordingly, the medial segments 236a and the lateral segments 236b of the torsion ply 224c may extend substantially parallel to the longitudinal axis $A_F$ within the interior region 242 and diverge away from one another when extending toward their respective ends at one of the lateral and medial sides 22, 24, respectively. In some implementations, the example of the torsion ply 224c provides the upper layer 222 with a greater concentration/density of fibers 227 within the interior region 242 compared to the concentration/density of fibers outside the interior region 242, thereby increasing the stiffness of the outsole plate 214 within the interior region 242.

As shown in FIG. 11C, the torsion ply 224c includes a void 243, 243a in the forefoot region 12 and a void 243, 243b in the heel region 16 where the fibers 227 are absent. In some examples, the voids 243 expose one or more plies 223, 224 or substrates 228 situated adjacent to the torsion ply 224c. When incorporated in a layered configuration to form the layers 221, 222, the torsion ply 224c does not impart any stiffness properties in the areas of the forefoot region 12 and the heel region 16 where the voids 243a, 243b are formed.

Figure 11D:
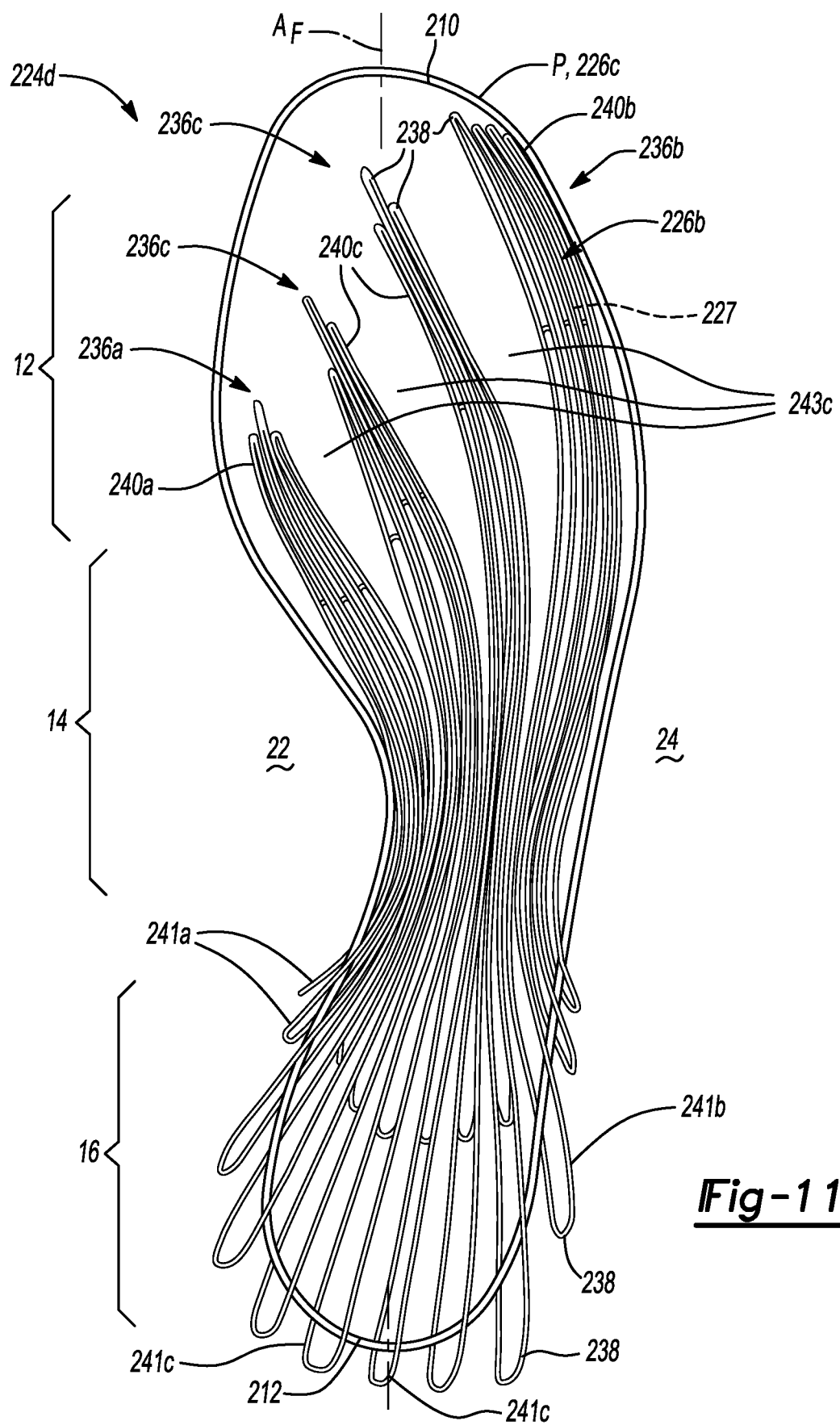

FIG. 11D provides a top view of another example of a torsion ply 224, 224d that may be used in one of the layers 221, 222. The pattern of the torsion strand 226b is shown relative to a peripheral edge P of the finished outsole plate 214, which may be defined by a peripheral strand 226c. As with the previous examples of torsion plies 224, the torsion ply 224, 224d may be formed from a corresponding continuous torsion strand 226b or two or more torsion strands 226b, and may include at least one of carbon fibers, aramid fibers, boron fibers, glass fibers, and polymer fibers. FIG. 11D shows the torsion ply 224d including corresponding loops 238 for connecting adjacent segments 236, 236a-236c of the torsion strand 226b. The loops 238 disposed in the forefoot region 12 are disposed inside the peripheral strand 226c, while the loops 238 proximate to the heel region 16 are disposed outside the peripheral strand 226c. To eliminate the presence of pinch points when subjecting the torsion ply 224d to pressure (e.g., molding) to form the outsole plate 214, the loops 238 proximate to the heel region 16 are cut along the peripheral strand 226c to remove the presence of loops 238 extending outside the peripheral strand 226c.

Compared to examples of the torsion plies 224, 224a-224c described above, the torsion ply 224d of FIG. 11D provides a greater variance in stiffness across the length of the outsole plate 214. Interior segments 236c of the ply 224d extend substantially parallel to the longitudinal axis $A_F$ from the heel region 16 to the midfoot region 14, while segments along the lateral side 22 and the medial side 24 converge toward the interior region 242 of the outsole plate 214 when extending from the heel region 16 to the midfoot region 14. As a result, the torsion ply 224d includes a spacing between adjacent segments 236, 236a-236c in the heel region 16 that decreases as the segments 236, 236a-236c extend into the midfoot region 14, whereby the midfoot region 14 of the outsole plate 214 is associated with greater density of fibers 227 than the heel region 16.

In some configurations, the segments 236 disperse into four discrete groups of segments 236 when extending from the midfoot region 14 to the first ends 240 disposed in the forefoot region 12 of the torsion ply 224d. For instance, a group of medial segments 236a generally follows the peripheral strand 226c of the torsion ply 224d at the medial side 22, while a group of lateral segments 236b generally follows the peripheral strand 226c of the torsion ply 224d at the lateral side 24. Moreover, a first group of interior segments 236c is disposed adjacent and spaced inward from the group of the medial segments 236a, and a second group of interior segments 236c is disposed adjacent and spaced inward from the group of the lateral segments 236b. In the example shown, the first and second groups of interior segments 236c are also spaced apart from one another. Accordingly, the torsion ply 224d includes multiple voids 243c between the groups of segments 236 where the fibers 227 are absent, thereby exposing one or more plies 223, 224 or substrates 228 that may be situated adjacent to the torsion ply 224d in the forefoot region 12. Here, the layer 221, 222 associated with the torsion ply 224d does not impart any stiffness properties in the areas of the forefoot region 12 where the presence of fibers 227 are absent. Each group of segments 236 corresponds to a respective "tendon" imparting stiffness properties based on the number of segments and/or spacing between adjacent segments in each discrete group. More specifically, the discrete groups of segments 236 cooperate to impart anisotropic stiffness and gradient load paths through the forefoot region 12 of the outsole plate 214. For instance, the longitudinal stiffness and the transverse stiffness taken at different locations in the forefoot region 12 may alternate between some magnitude of stiffness provided by the concentration fibers 227 in the corresponding group and no stiffness where the presence of fibers 227 is absent.

In some examples, the medial segments 236a are shorter than the first group of interior segments 236c adjacent to the medial segments 236a, the first group of interior segments 236c are shorter than the second group of interior segments 236c adjacent to the lateral segments 236b, and the second group of interior segments 236c are longer than the group of lateral segments 236b. In some configurations, at least one of the groups of segments 236 includes a different number of segments 236 than the other groups. In other configurations, each group of segments includes the same number of segments 236 as the other groups. Increasing the number of segments 236 in a corresponding group provides a greater concentration of fibers 227 and, thus, imparts a greater stiffness for the corresponding group.

In some implementations, the spacing between adjacent segments 236 in at least one of the groups varies across the length of the torsion ply 224d between the midfoot region 14 and the first ends 240 in the forefoot region 12. For instance, the spacing between adjacent segments 236 in at least one of the groups may increase as the segments 236 traverse into the forefoot region 12 from the midfoot region 14, and then the spacing may gradually decrease until the segments terminate at the corresponding loops 238 in the forefoot region 12. In other implementations, the spacing between adjacent segments 236 in at least one of the groups is substantially uniform across the length of the torsion ply 224d between the midfoot region 14 and the loops 238 in the forefoot region 12.

Due to the spacing between adjacent segments 236 of the torsion ply 224d being closer in the midfoot region 14 compared to the spacing in the heel region 16, the torsion ply 224b collectively provides a greater concentration/density of fibers 227 in the midfoot region 14 compared to the concentration/density of fibers 227 in the heel region 16. Moreover, due to the segments 236 branching out into four discrete groups while traversing the torsion ply 224d from the midfoot region 14 to the forefoot region 12, the concentration/density of fibers 227 in the midfoot region 14 is greater than the density of fibers 227 in the forefoot region 12 where the fibers 227 are absent in the voids 243c between each discrete group of segments 236. Accordingly, the torsion ply 224d imparts different stiffness properties to the outsole plate 214 in each of the forefoot, midfoot, and heel region 12, 14, 16, respectively.

Figures 11E, 11F:
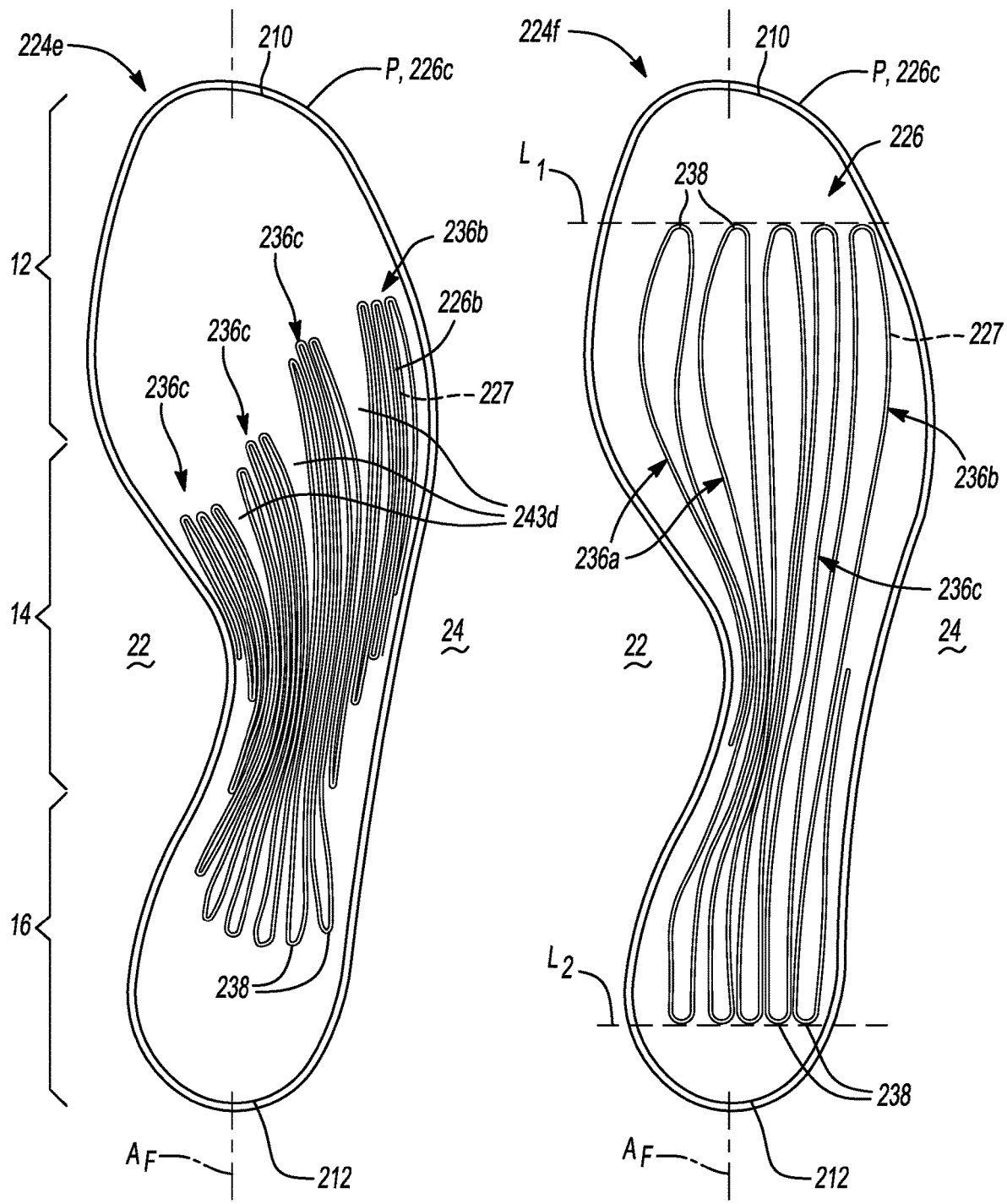
Figure 12A:
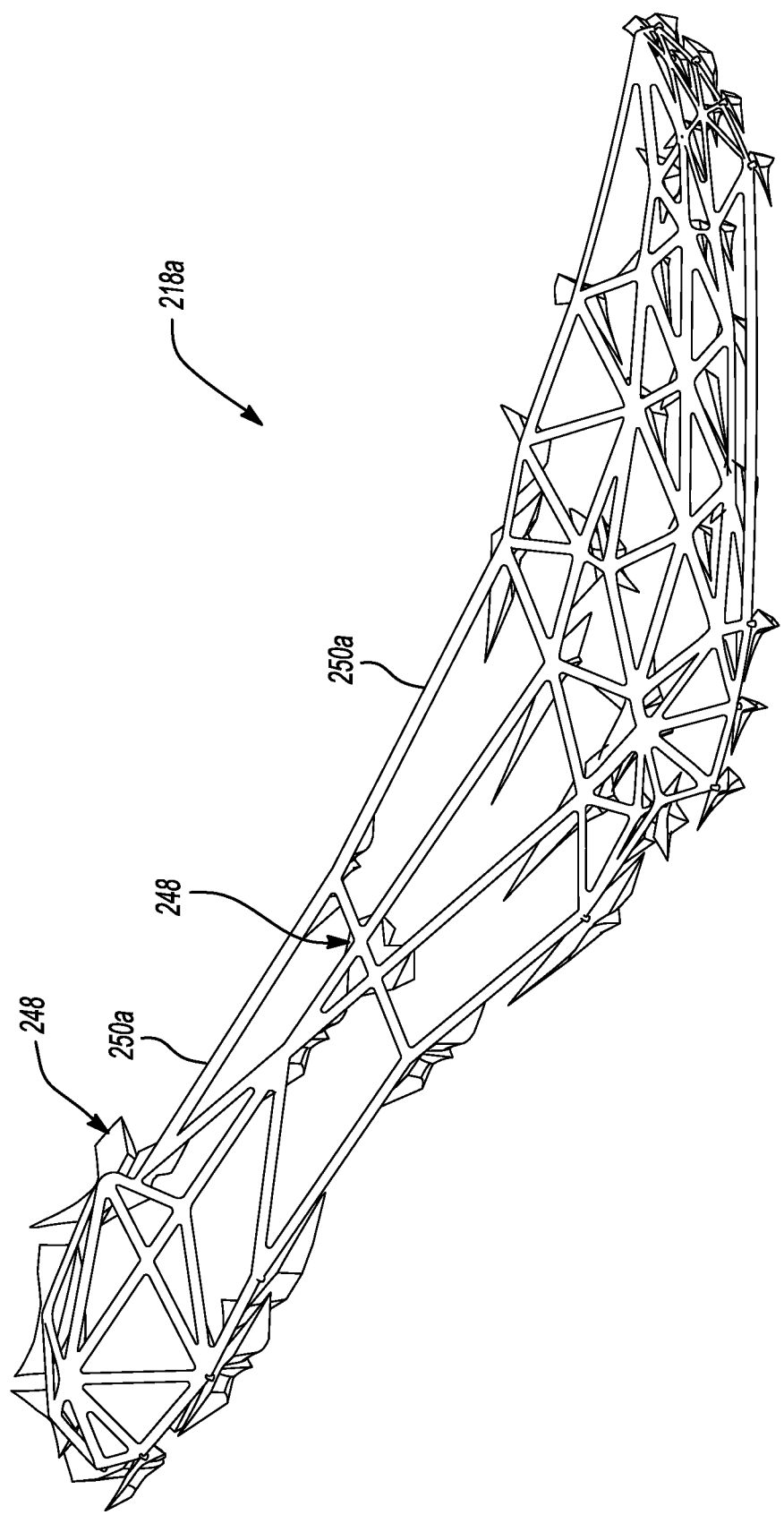
Figure 12B:
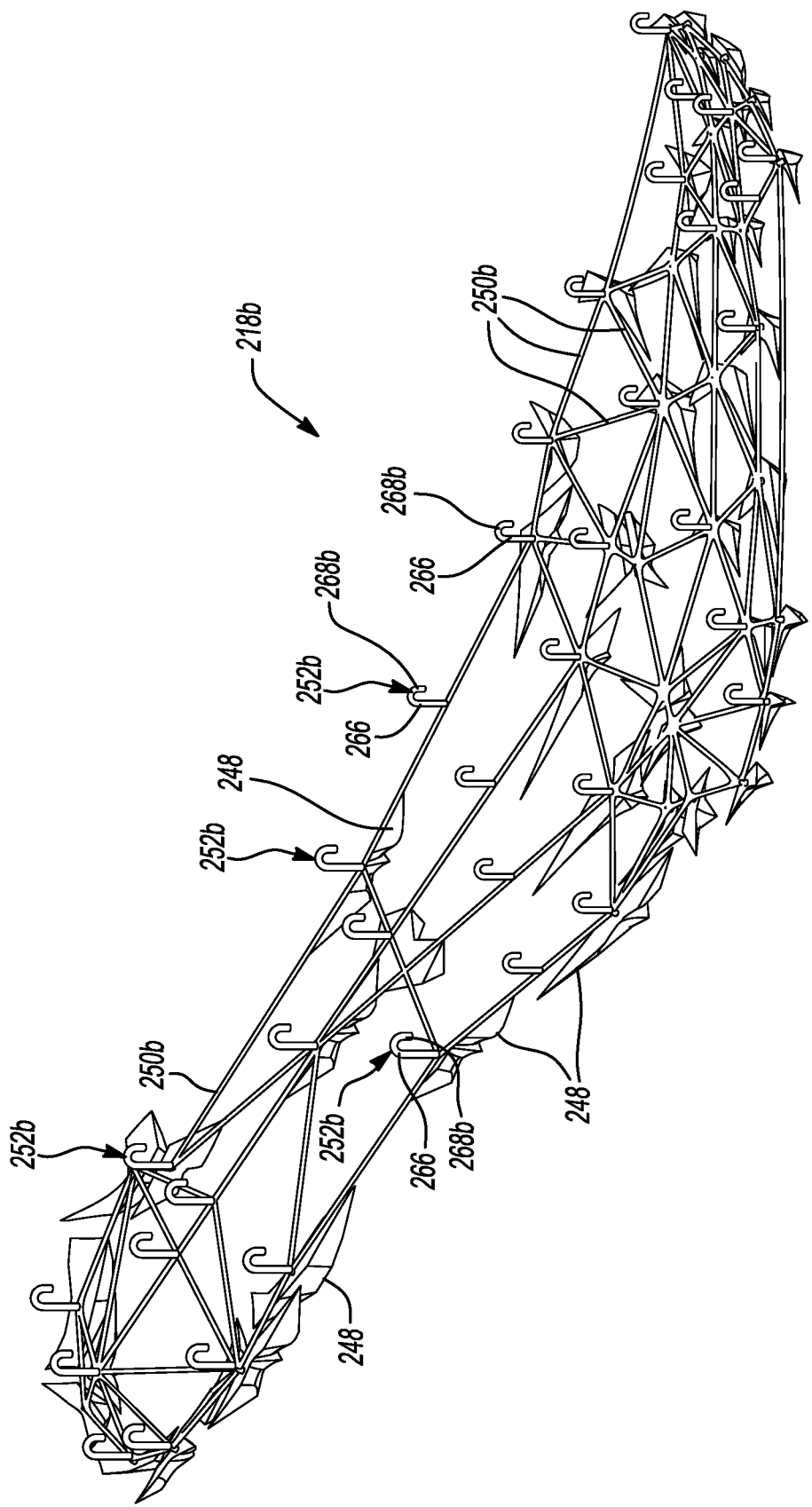
Figure 12C:
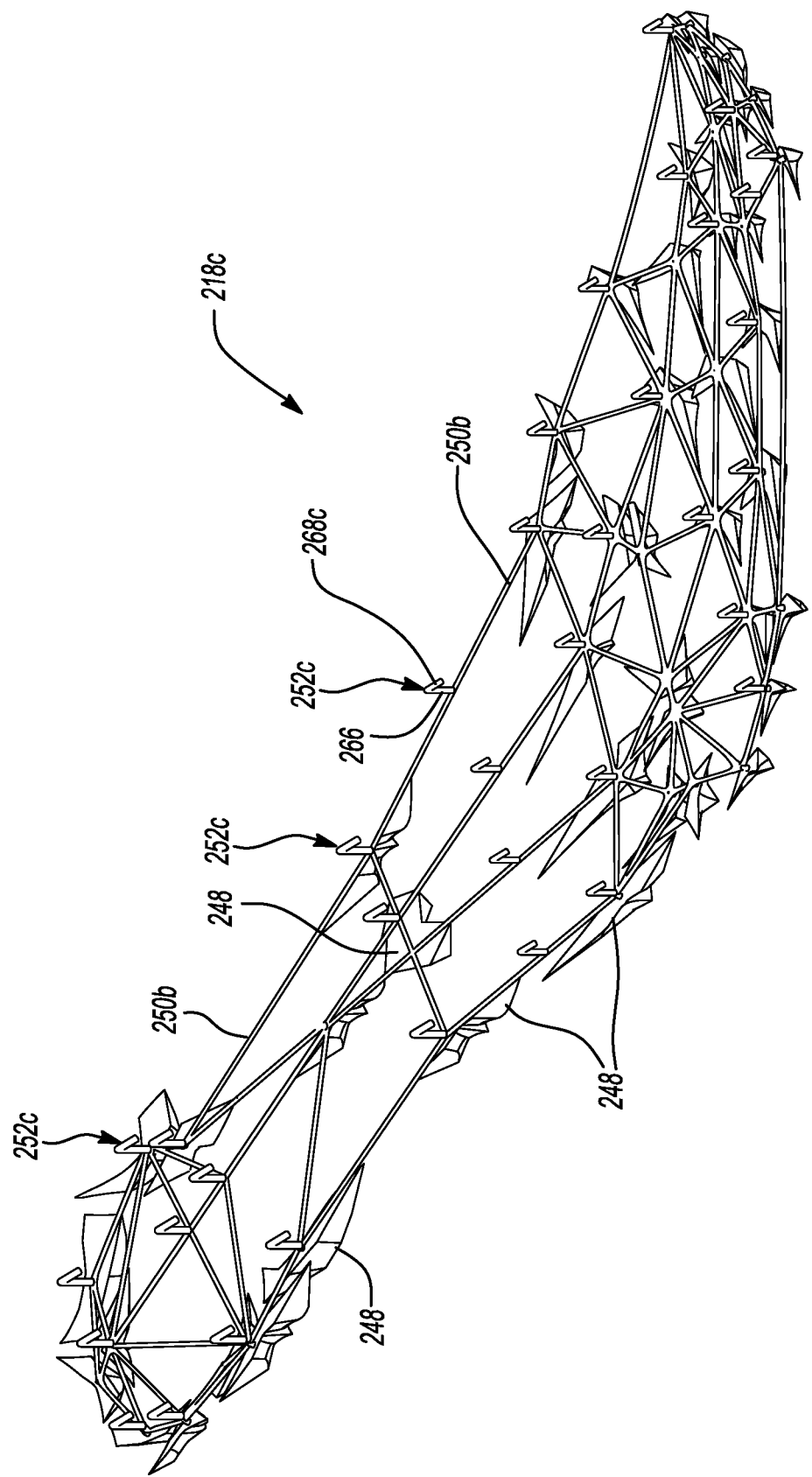
Figure 12D:
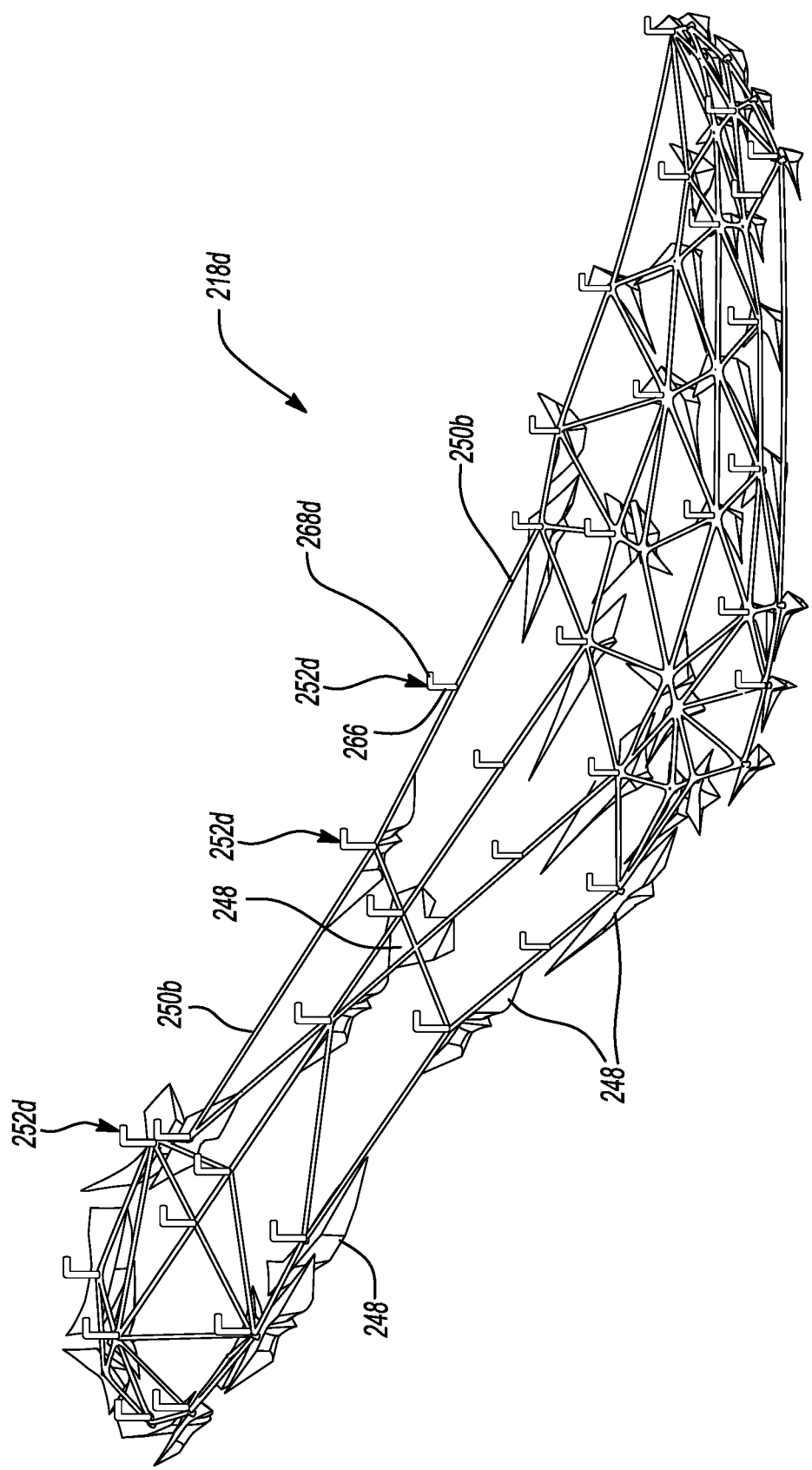
Figure 12E:
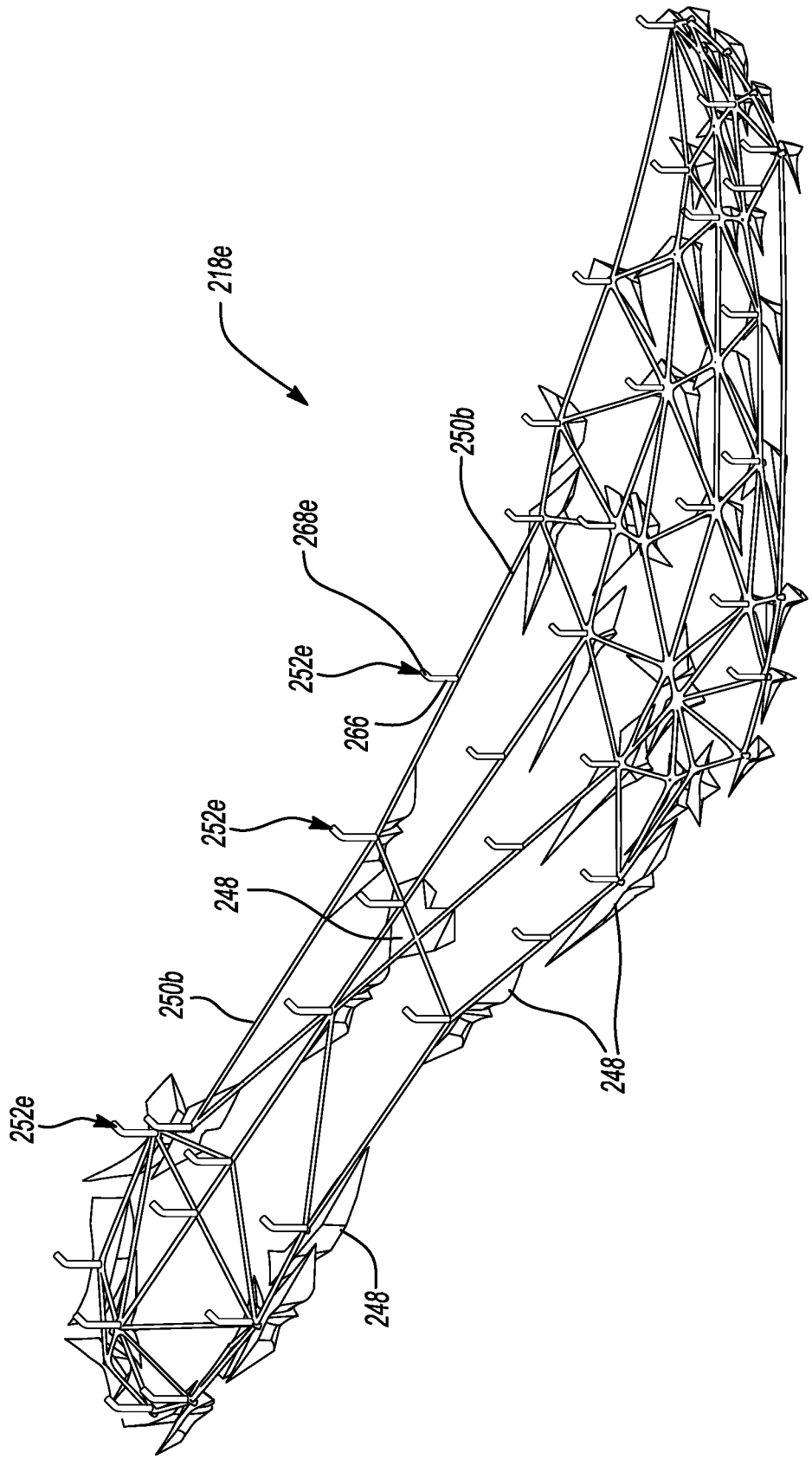
Figure 12F:
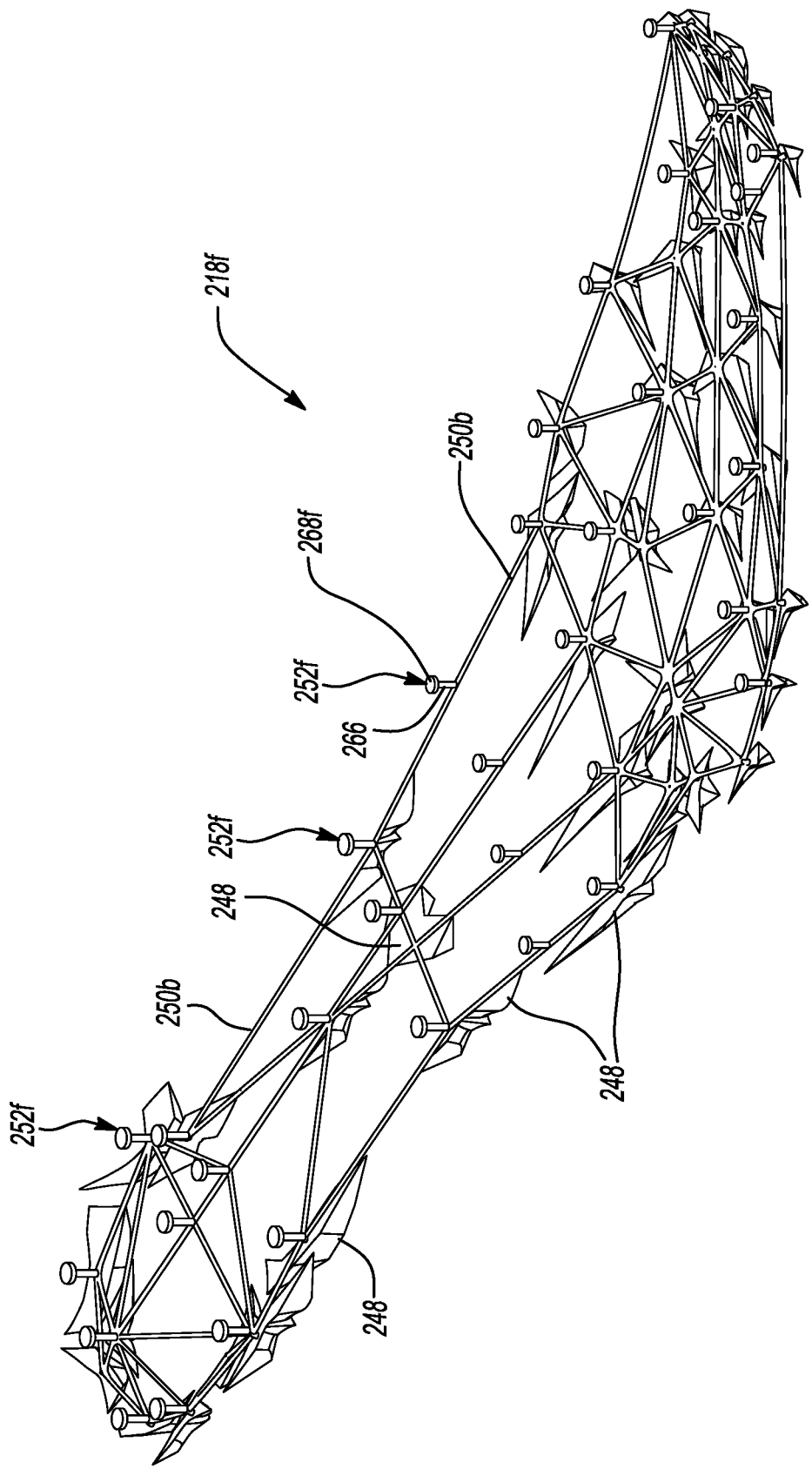

FIG. 11E shows another example of a torsion ply 224, 224e that may be used in the layers 221, 222. The pattern of the torsion strand 226 is shown relative to a peripheral edge P of the finished outsole plate 214. The torsion ply 224e is substantially similar to the torsion ply 224d shown in FIG. 11D, except that segments 236, 236a-236c of fibers 227 are shorter than the corresponding segments 236, 236a-236c of the torsion ply 224d. For instance, the torsion ply 224e includes segments 236 having a shortened length, whereby fibers 227 are absent in a majority of both the forefoot region 12 and the heel region 16.

The interior segments 236c of the torsion ply 224e extend substantially parallel to the longitudinal axis $A_F$ from corresponding loops 238 disposed in the heel region 16, while segments 236a, 236b closer to the medial side 22 and the lateral side 24 converge toward the interior region 242 of the footwear when extending from the corresponding loops 238 disposed in the heel region 16. However, in contrast to the torsion ply 224d having adjacent segments 236 that extend across the width of the midfoot region 14, the segments 236 forming the torsion ply 224e are concentrated toward the interior region of the torsion ply 224e within the midfoot region 14, while defining gaps along the peripheral edge P where the fibers 227 are absent and, thus, not imparting stiffness.

Similar to the torsion ply 224d, the segments 236 of the torsion ply 224e also disperse into four discrete groups of segments 236 when extending from the midfoot region 14 to the loops 238 disposed in at least one of the forefoot region 12 or the midfoot region 14. For instance, a group of medial segments 236a generally follows the peripheral strand 226c of the torsion ply 224d at the medial side 22 and terminate in the forefoot region 12, while a group of lateral segments 236b generally follows the peripheral strand 226c of the torsion ply 224d at the lateral side 24 and terminate in the midfoot region 14. Moreover, a first group of interior segments 236c is adjacent and spaced inward from the group of medial segments 236a, and a second group of interior segments 236c is adjacent and spaced inward from the group of the lateral segments 236b. Accordingly, the torsion ply 224e includes multiple voids 243d between the groups of segments 236 where the fibers 227 are absent, thereby exposing one or more plies 223, 224 or substrates 228 that may be situated adjacent to the torsion ply 224d in the forefoot region 12. Here, torsion ply 224e does not impart any stiffness properties in the voids 243d in the forefoot region 12 between the groups of segments 236. However, the discrete groups of segments 236 cooperate to impart anisotropic stiffness and gradient load paths in regions extending toward the forefoot region 12 and away from the high concentration/density of fibers 227 in the midfoot region 14, where the magnitude of stiffness is greatest.

In some examples, the group of medial segments 236a are shorter than the first group of interior segments 236c, the first group of interior segments 236c are shorter than the second group of interior segments 236c, and the second group of interior segments 236c are shorter than the group of lateral segments 236b. In some configurations, at least one of the groups of segments 236 includes a different number of segments 236 than the other groups. In other configurations, each group of segments 236 includes the same number of segments 236 as the other groups. Increasing the number of segments 236 in a corresponding group provides a greater concentration of fibers 227 and, thus, imparts a greater stiffness for the corresponding group. Additionally, the spacing between adjacent segments 236 in at least one of the groups may vary or may be substantially uniform as the segments traverse toward the forefoot region 12 of the torsion ply 224e. For instance, the spacing between segments 236 in at least one of the groups may initially increase as the segments begin to traverse toward the forefoot region 12 from the midfoot region 14, and then the spacing may gradually decrease until the segments 236 terminate at the corresponding loops 238 in the forefoot region 12 or in the midfoot region 14 at a location proximate to the forefoot region 12.

FIG. 11F provides a top view of a fifth example of a torsion ply 224f that may be used in either of the layers 221, 222. The pattern of the torsion strand 226b of the torsion ply 224f is shown relative to a peripheral edge P of the finished outsole plate 214. The torsion ply 224f may be formed from one continuous torsion strand 226b or from two or more strands 226 of fibers 227.

FIG. 11F shows the torsion ply 224f having a plurality of segments 236 having the same length extending between a first location $L_1$ disposed in the forefoot region 12 and a second location $L_2$ disposed in the heel region 16. The torsion strand 226b includes loops 238 disposed at the first location $L_1$ and the second location $L_2$ for connecting adjacent segments 236. In the example shown, the segments 236a proximate to the medial side 22 of the ply 224f converge toward the interior of the ply 224f when extending from the second location $L_2$ toward the medial region 14, and then diverge and fan out away from the interior of the ply 224f when extending from the medial region 14 to the first location $L_1$. Thus, the segments 236a proximate the medial side 22 generally follow the curvature of the peripheral strand 226c of the torsion ply 224f at the medial side 22. Conversely, the segments 236b of the torsion ply 224f proximate to the lateral side 24 of the ply 224f and within the interior of the outsole plate 214 extend substantially parallel to one another and substantially parallel to the longitudinal axis $A_F$ between the first location $L_1$ and the second location $L_2$. The converging by the segments 236a proximate to the medial side 22 into the interior of the torsion ply 224f causes the spacing between adjacent segments 236a in the medial region 14 of the plate to decrease and, thus, provide a greater magnitude of stiffness in the midfoot region 14 due to the corresponding increase in the concentration/density of fibers 227. Moreover, the spacing between each adjacent segment 236 of the torsion ply 224f is greater in the forefoot region 12 proximate to the first location $L_1$ compared to the spacing between each adjacent segment 236a in the heel region 16 proximate to the second location $L_2$. Accordingly, the torsion ply 224f provides the heel region 16 with a magnitude of stiffness that is less than the magnitude of stiffness in the midfoot region 14 and greater than the magnitude of stiffness in the forefoot region 12. In other configurations, the spacing between each adjacent segment 236 of the torsion ply 224f is substantially uniform across the lengths of the segments 236 between the first location $L_1$ and the second location $L_2$.

FIG. 11G provides a top view of a sixth example of a configuration of a torsion ply 224g that may be used in the layers 221, 222 of the outsole plate 214. The pattern of the sixth example of the torsion ply 224g is shown relative to a peripheral edge P of the finished outsole plate 214. In the example shown, torsion ply 224g is formed from one continuous torsion strand 226b. However, in other examples, the torsion ply 224g may be formed from two or more strands 226 of fibers 227.

FIG. 11G shows a torsion strand 226b of the torsion ply 224f having a plurality of segments 236, 236a-236c that each extend along the length of the ply 224f from a first location $L_1$ disposed in the heel region 16 to a corresponding second, third, and fourth locations $L_2$, $L_3$, $L_4$ disposed in the forefoot region 12 of the outsole plate 214. For instance, lateral segments 236b extend between the first location $L_1$ and the corresponding second location $L_2$, while medial segments 236a extend between the first location $L_1$ and the corresponding fourth location $L_4$ disposed closer to the first end 210 of the outsole plate 214 than the second location $L_2$ corresponding to the lateral segments 236b. Additionally, interior segments 236c disposed between the medial segments 236a and the lateral segments 236b extend between the first location $L_1$ and the corresponding third location $L_3$. In the example shown, the third location $L_3$ corresponding to the interior segments 236c is disposed closer to the first end 210 of the outsole plate 214 than the second location $L_2$ corresponding to the lateral segments 236b and further away from the first end 210 of the outsole plate 214 than the fourth location $L_4$ corresponding to the medial segments 236a. The torsion strand 226b includes loops 238 disposed at each location $L_1$-$L_4$ for connecting adjacent segments 236 of the torsion ply 224f.

In some implementations, the corresponding second, third, and fourth locations $L_2$, $L_3$, $L_4$ cooperate to define a terminal end the torsion ply 224f in the forefoot region 12 that aligns with an anatomical feature of the foot when the foot is received upon the outsole plate 214 within the article of footwear 10. In some examples, the anatomical feature includes a bend line of all the toes of the foot. The bend line may extend through the metatarsal-phalangeal (MTP) joints of the foot where proximal phalanges of the toes meet corresponding metatarsals of the foot. Accordingly, each segment 236 may impart stiffness to the outsole plate 214 under the wearer's foot up to the MTP joints without imparting any stiffness in areas of the outsole plate 214 where the toes of the foot reside to provide desirable flexibility during athletic movements.

The medial segments 236a may be disposed adjacent and substantially parallel to one another along the longitudinal axis $A_F$ of the outsole plate 214 proximate to the peripheral strand 226c at the medial side 22. In some examples, the spacing between each adjacent medial segment 236a is substantially uniform across the length of the medial segments 236a between the first location 479 and the fourth location $L_4$. In other examples, the spacing between each adjacent medial segment 236a varies across the length such that the spacing between each adjacent medial segment 236a is closer within the midfoot region 14 compared to the spacing within the forefoot and heel regions 12, 16, respectively.

The lateral segments 236b may be disposed adjacent and substantially parallel to one another along the longitudinal axis $A_F$ of the outsole plate 214 proximate to the peripheral strand 226c at the lateral side 24. In some examples, the spacing between each adjacent lateral segment 236b is substantially uniform across the length of the lateral segments 236b between the first location $L_1$ and the second location $L_2$. In other examples, the spacing between each adjacent lateral segment 236b varies across the length such that the spacing between each adjacent lateral segment 236b is closer within the midfoot region 14 compared to the spacing within the forefoot and heel regions 12, 16, respectively. Providing a narrower spacing between adjacent segments offers a greater concentration/density of fibers 227 to thereby increase the stiffness of the outsole plate 214.

Within interior regions of the outsole plate 214, the interior segments 236c may be disposed adjacent and substantially parallel to one another along the longitudinal axis $A_F$ of the outsole plate 214. As with the medial segments 236a and the lateral segments 236b, the spacing between each adjacent interior segment 236c may be substantially uniform or may vary across the length of the interior segments 236c between the first location $L_1$ and the third location $L_3$.

In some configurations, the segments 236a-236c of the torsion ply 224g are disposed adjacent and substantially parallel to one another within the midfoot and heel regions 14, 16, respectively, and then disperse from one another when extending from the midfoot region 14 to each of the corresponding second, third, and fourth locations $L_2$, $L_3$, $L_4$ disposed in the forefoot region 12. For instance, the medial segments 236a may generally follow the contour of the peripheral strand 226c of the torsion ply 224g at the medial side 22, the lateral segments 236b may generally follow the contour of the peripheral strand 226c of the torsion ply 224g at the lateral side 24, and the interior segments 236c may extend substantially parallel to the longitudinal axis $A_F$ as the lateral and medial segments 236a, 236b diverge outward and away from the interior segments 236c. Here, the torsion ply 224f does not impart any stiffness properties in the voids 243d in the forefoot region 12 between the segments 236, 236a-236c where the fibers 227 are absent. However, the dispersing of the segments 236, 236a-236c of the torsion ply 224g imparts anisotropic stiffness and gradient load paths in regions extending into the forefoot region 12 and away from the high concentration/density of fibers 450 in the midfoot region 14, whereat the magnitude of stiffness is highest.

As set forth above, one or more of at least one of the torsion plies 224, 224a-224g of FIGS. 11A-11G may be incorporated into upper layer 222 or the lower layer 221 to tune stiffness properties imparted by the finished outsole plate 214.

With continued reference FIGS. 3-6B, the first traction elements 216 include a flange 244 and a ground-engaging projection 246 extending from the flange 244. In one example, the flange 244 is substantially cylindrical in shape, and may include a plurality of notches or apertures formed through a thickness thereof. In some examples, the flange 244 may include a plurality of radially-arranged tabs or notches configured to engage the components 220, 222, 223 of the outsole plate 214 (i.e. layers 221, 222 and resin 220) to prevent rotation of the first traction elements 216 within the outsole plate 214. The projection 246 extends axially from the flange 244, and may taper in width along a direction from the flange 244 to a distal end. As shown, the projection 246 is conical in shape. However, the projection 246 may be pyramidal, or have other geometries.

As shown in FIGS. 5A-6B, in one example the first traction element 216, 216a may be formed as a unitary body, whereby the flange 244, 244a and the projection 246, 246a are integrally formed with each other. Additionally or alternatively, one or more of the first traction elements 216, 216b may be fragmentary, whereby the projection 246, 246b is configured to be removably attached to the flange 244, 244b. For example, the flange 244, 244b may be an anchor portion having a first cleat-retention feature 247a and the projection 246, 246b may be a separately-formed cleat having a second cleat-retention feature 247b configured to cooperate with the first cleat-retention feature 247a of the flange 244, 244b. In one example, the first cleat-retention feature 247a may be a female-threaded bushing, while the second cleat-retention feature 247b is a male-threaded stud. Accordingly, the different projections 246 can be attached to the flange 244 to provide desired traction characteristics to the outsole 204. The outsole 204 may include only unitary first traction elements 216a, only fragmentary first traction elements 216b, or a combination of unitary first traction elements 216a and fragmentary first traction elements 216b.

In addition to the first traction elements 216, the outsole 204 may also include the ground-engaging assembly 218 including a plurality of traction elements 248 interconnected with each other by respective connecting members 250. As shown in FIGS. 12B-12F, the ground-engaging assembly may include a plurality of fasteners 252 extending therefrom, which are configured to engage one or more of the plies 223, 224 to secure the ground-engaging assembly 218 to the outsole 204 prior to molding.

As best shown in FIG. 4, the traction elements 248 of the ground-engaging assembly 218 may be described as being chevron-shaped, and include a pair of wings 254 extending in opposite directions from a central portion 256. In some examples, at least one of the wings 254 may include a compound taper, whereby a width of the wing 254 tapers along a first direction—parallel to the ground-engaging surface—from the central portion 256 to a terminal end 258, and along a second direction—perpendicular to the ground-engaging surface—from a base 260 to a distal edge 262.

As shown in FIGS. 12A-12F, the ground-engaging assembly 218, 218a-218f includes one of the connecting members 250 extending between each pair of adjacent traction elements 248. Accordingly, each traction element 248 may be connected to a plurality of adjacent traction elements 248 by respective connecting members 250, such that the connecting members 250 and the traction elements 248 form a web or network. For example, a first one of the traction elements 248 may be connected to a second one of the traction elements 248 by a first connecting member 250, and connected to a third one of the traction elements 248 by a second connecting member 250. Thicknesses of the connecting members 250 may be selected to impart desired properties of strength and stability to the ground-engaging assembly 218. For instance, the connecting members 250a of the example of the ground-engaging assembly 218a shown in FIG. 12A have a greater thickness than the connecting members 250b-f of the examples of the ground-engaging assembly shown in FIGS. 12B-12F.

In the illustrated example, the ground-engaging assembly 218 includes a continuous network of connecting members 250 and traction elements 248 extending along an entire length of the outsole 204. However, in other examples, the ground-engaging assembly 218 may be fragmentary, and include a first sub-network of traction elements 248 and connecting members 250 disposed in a first region 12, 14, 16 and a separately formed, second sub-network of traction elements 248 and connecting members 250 disposed in a second region 12, 14, 16.

As provided above, in some examples, the ground-engaging assembly 218, 218b-218f further includes a plurality of the fasteners 252 configured to engage one or more of the plies 223, 224 to secure the ground-engaging assembly 218 to the layers 221, 222 during assembly of the outsole 204, as discussed below. The fasteners 252 project from the connecting members 250 in an opposite direction from the traction elements 248. As shown in FIGS. 12B-12F, some examples of the fasteners 252 include a shaft 266 extending from one of the connecting members 250 and a retention feature 268 disposed at a distal end of the shaft 266.

In a first example of the ground-engaging assembly 218, 218b-218, the retention feature 268 of the fastener 252b-252e is an arm 268a-268d extending from the distal end of the shaft 266. In one example of the fastener 252b, the arm 268a may be curved to provide rounded, hook-shaped arms 268b. In other examples of the fastener 252c-252e, the arm 268c-268e may be elongate and extend along a longitudinal axis at a relative angle to a longitudinal axis of the shaft 266. For example, a longitudinal axis of the arm 268c may be arranged at an acute angle with respect to a longitudinal axis of the shaft 266 to provide a hook-shaped retention feature 268c having a tapered or flared profile for being inserted through the plies 223, 224 to capture one or more of the strands 226. In other examples, the longitudinal axis of the arm 268d may be perpendicular to the longitudinal axis of the shaft 266. Additionally or alternatively, the longitudinal axis of the arm 268e may extend at an obtuse angle with respect to the longitudinal axis of the shaft 266, whereby the arm 268e extends away from traction elements 248.

In another example of the ground-engaging assembly 218, 218f, the retention feature 268 is an anchor 268f disposed at the distal end of the shaft 266. For example, the anchor 268f may include a body having a greater width than the shaft 266 so that the anchor 268f engages one or more of the strands 226 of the plies 222, 224 when the outsole 204 is assembled. In the illustrated example, the anchors 268f are cylindrical or disc-shaped bodies having a greater diameter than the shaft 266. However, other shapes of anchors 268f may be used, as desired. Although the illustrated examples of the ground-engaging assembly 218, 218b-218f each include a single type of the fastener 252, 252b-252f, some examples may include multiple types of the fasteners 252, 252b-252f. For example, the ground-engaging assembly 218 may include some fasteners 252 having arms 268b-268e and other fasteners 252 having anchors 268f, as shown in FIGS. 5A-6B.

The ground-engaging assembly 218 may be formed using additive manufacturing methods, such as three-dimensional (3D) printing. For example, the ground-engaging assembly may be 3D printed of a polymeric material, such as nylon. By forming the ground-engaging assembly 218 using a three-dimensional printing process, the traction elements 248, connecting members 250, and fasteners 252 can be easily modified for different applications. Furthermore, the three-dimensional printing process allows the fasteners 252 to be formed with complex geometries not capable of being formed using traditional molding processes. For example, ground-engaging assemblies 218 having fasteners 252 that are formed with hook-shaped arms 268a, 268b or anchors 268e are difficult to manufacture using traditional molding processes, as the arms 268a, 268b and anchors 268e may cause the ground-engaging assembly 218 become to fixed within a mold cavity. Additionally, three-dimensional printing allows the traction elements 248 to be customized on an individual basis to accommodate different users, sports, and playing surfaces.

With particular reference to FIGS. 13A-13D, formation of the outsole 204 is described in conjunction with a mold 1000. The mold 1000 includes an upper mold plate 1002 and a lower mold plate 1004. The mold plates 1002, 1004 define a mold cavity 1006 having the desired shape of the outsole 204 to allow the mold 1000 to impart the desired shape of the particular outsole 204 to the plies 222, 224. The mold cavity 1006 may include one or more fixtures 1008 for securing the first traction elements 216 within the mold 1000. For example, the fixtures 1008 may be magnetic and include conical cavities for receiving the projections 246 of the first traction elements 216. The benefits of the retainers 1008 are twofold. First, the fixtures 1008 align the first traction elements 216 within the mold to ensure proper spacing and arrangement. Secondly, the fixtures 1008 secure the first traction elements 216 within the mold cavity 1006 when the resin 220 is introduced, and prevent the first traction elements 216 from floating within the resin 220.

Initially, each of the lower layer 221 and the upper layer 222 may be fabricated using desired combinations of the substrates 228 and plies 223, 224 discussed above. Once the layers 221, 222 are assembled, the loops 238 may be trimmed to provide a continuous outer peripheral edge P of each layer 221, 222, as shown in FIG. 11A. In addition to fabricating the layers 221, 222, the lower layer 221 may be provided with the first traction elements 216.

With each of the layers 221, 222 fabricated, the first traction elements 216, the ground-engaging assembly 218, lower layer 221, and the upper layer 222 may be arranged and assembled to form a layup of the outsole 204. In some examples, the components 216, 218, 221, 222 of the outsole 204 may be assembled outside of the mold cavity 1006, and then positioned within the mold cavity 1006 as an assembly. Alternatively, the mold cavity 1006 may function as an assembly fixture, whereby the components 216, 218, 221, 222 can be stacked within the mold cavity 1006. For example, the lower mold plate 1004 may include features corresponding to the shapes of the traction elements 248 of the ground-engaging assembly 218 so that the ground-engaging assembly 218 can be positioned within the mold cavity 1006.

With continued reference to FIGS. 5A, 6A, and 11A, lower layer 221 is initially stacked upon the ground-engaging assembly 218. In addition to providing for handling of the ground-engaging assembly, the connecting members 250 may collectively provide a support bed for the layers 221, 222. When present, the shafts 266 may be received through one or more of the plies 223, 224 such that the fasteners 252 of the ground-engaging assembly 218 engage a top side of at least one of the plies 223, 224 as the lower layer 221 is stacked atop the ground-engaging assembly. Particularly, the fasteners 252 may become entangled with the fibers 227 of one or more of the plies 223, 224 to secure the ground-engaging assembly to the plies 222, 224. A length of the shaft 266 of each of the fasteners 252 may be selected depending on a thickness of each of the plies 223, 224 and a desired engagement between the fasteners 252 and the plies 223, 224. Accordingly, one or more of the fasteners 252 may engage the support plies 223 of the lower layer 221. Additionally or alternatively, one or more of the fasteners may engage the plies 223, 224 of the upper layer 222.

The first traction elements 216 may be provided to the outsole 204 lay-up at any time prior to the upper layer 222, regardless of whether the outsole 204 is assembled outside of the mold cavity 1006 or inside of the mold cavity 1006. For example, the first traction elements 216 may be provided to the apertures 225 of the lower layer 221 before or after the lower layer 221 is stacked atop the ground-engaging assembly 218. As discussed above, once the first traction elements 216 are received within the mold cavity 1006, the projections 246 of the first traction elements 216 are engaged by the fixtures 1008 formed in the mold cavity 1006 to align and secure the first traction elements 216 within the mold 1000.

As discussed above, in some examples the first traction elements 216a may each be formed as unitary bodies having a flange 244a and a projection 246a protruding from the flange 244a. In this configuration, the projection 246 of each of the first traction elements 216 may be inserted through the apertures 225 of the lower layer 221 so that the projections 246 are received through the substrate 228a and the strands 226, as shown in FIGS. 5A and 6A. Accordingly, the projections 246 will project from the ground-engaging surface 208 of the outsole 204. As the projections 246 of each of the first traction elements 216 are inserted through the apertures 225, the flanges 244 of each of the first traction elements 216 engage or abut an upper surface of the substrate 228a of the lower layer 221. In other examples, an upper surface of the lower layer 221 may be defined by one of the plies 223, 224, and the flanges 244 of each of the first traction elements 216 may abut or become entangled within the strands 226 of the plies 223, 224. Additionally or alternatively, the outsole 204 may be constructed with one or more of the fragmentary first traction elements 216b, whereby the flange 244b and the projection 246b are provided to outsole 204 in a pre-assembled state.

Once the first traction elements 216 are inserted in the lower layer 221, the upper layer 222 is layered upon the lower layer 221 in a back-to-back arrangement, such that the substrate 228a of the lower layer 221 is on top and contacts the substrate 228b of the upper layer 222, as shown in FIGS. 5A and 6A. Accordingly, the flanges 244 of the first traction elements 216 are interposed between the upper layer 222 and the lower layer 221. More specifically, the flanges 244 of the first traction elements 216 are disposed between and contact the substrate 228a of the lower layer 221 and the substrate 228b of the upper layer 222. In some examples, the torsion plies 224a, 224b may be stacked in a back-to-face arrangement, whereby the plies 223, 224 of each of the layers 221, 222 are arranged atop the respective substrates 228a, 228b, and the substrate 228b of the upper layer 222 contacts the strand 226 of the plies 222, 223 of the lower layer 221, or vice-versa. Alternatively, the layers 221, 222 may be arranged face-to-face, whereby the plies 223, 224 of each layer 221, 222 face inward towards each other such that the plies 222, 223 of the lower layer 221 and the plies 222, 223 of the upper layer 222 are in facing contact with each other.

As discussed above, the one or more of the fasteners 252 of the ground-engaging assembly 218 may also be configured to engage the plies 223, 224 of the upper layer 222 thereby securing each of the ground-engaging assembly 218, the lower layer 221, the first traction elements 216, and the upper layer 222 as a single assembly for placement into the mold cavity 1006. Additionally, or alternatively, the connecting members 250 and/or the traction elements 248 of the ground-engaging assembly 218 may be entangled with the strands 226 of one or more of the layers 221, 222 to secure a position of the ground-engaging assembly 218 with respect to the one or more of the layers 221, 222.

As shown in FIG. 13B, the assembled components 216, 218, 221, 222 of the outsole 204 are inserted between the mold plates 1002, 1004 within the mold cavity 1006. At this point, the mold 1000 is closed by moving the mold plates 1002, 1004 toward one another or by moving one of the mold plates 1002, 1004 toward the other mold plate 1002, 1004. It should be noted that while the plies 222, 224 are described as being pre-impregnated with resin material, the plies 222, 224 could additionally be supplied with resin 220 that is infused within the mold 1000 via an inlet 1010 once the mold plates 1002, 1004 are closed. Additionally or alternatively, the resin 220 may be poured into the mold cavity 1006 prior to closing the mold 1000. The injected or poured resin 220 could be in addition to the impregnated resin of the strands 226, or alternatively, could be used in place of the impregnated resin 220.

Figure 6B:
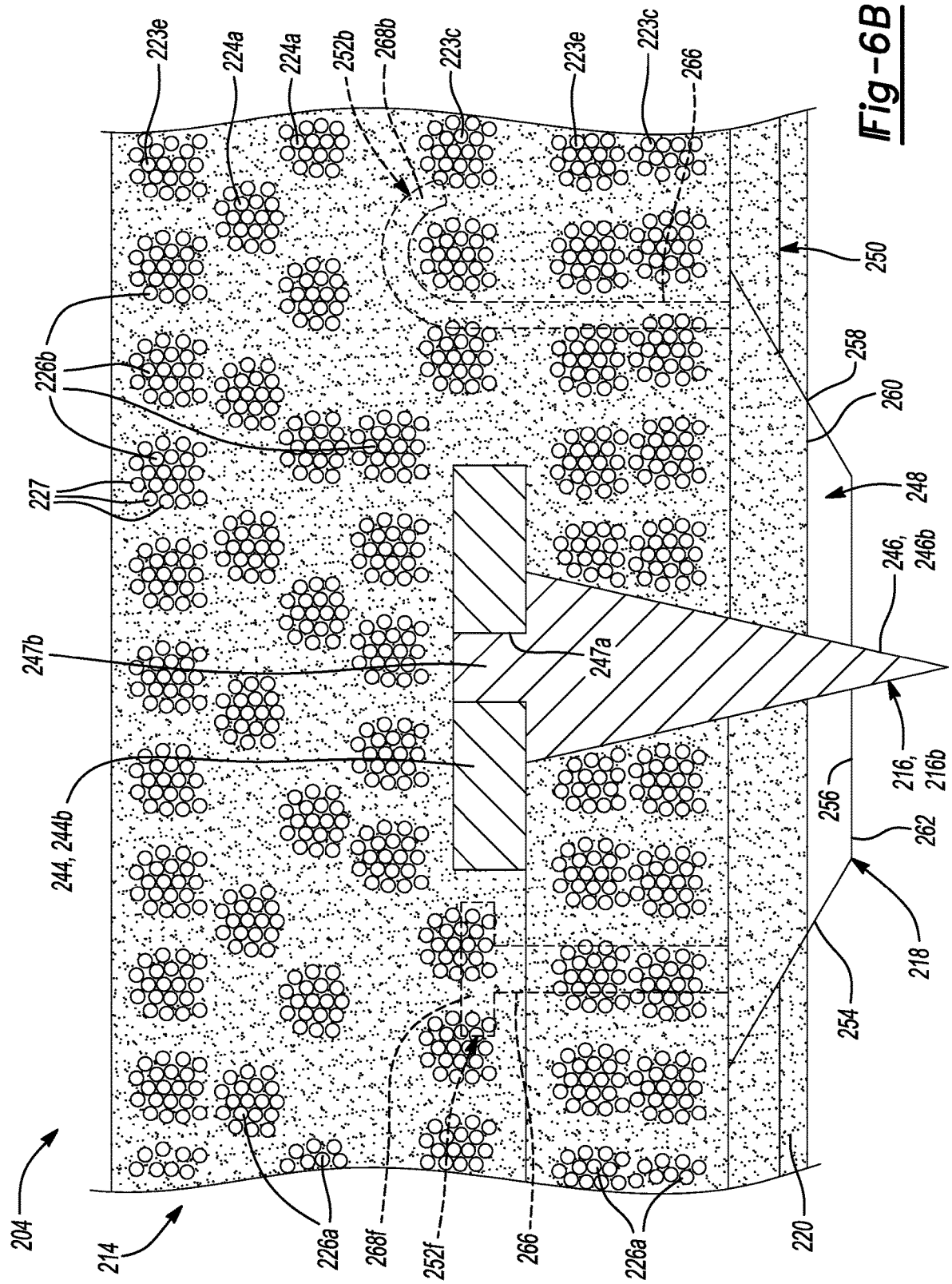
FIG. 6B is an enlarged fragmentary view of the outsole plate of FIG. 5B, taken at area 6B of FIG. 5B.

Once closed, the mold 1000 applies heat and pressure to the stacked layers 221, 222 disposed within the mold cavity 1006 to activate the resin 220 associated with the strands 226. The heat and pressure applied to the stacked layers 221, 222 causes the particular shape of the mold cavity 1006 to be imparted to the stacked plies 222, 224 and, once cured, the resin 220 associated with the stacked layers 221, 222 to harden and retain the desired shape. Additionally, the hardened resin 220 at least partially encapsulates the traction elements 248, the connecting members 250 of the ground-engaging assembly 218 to attach to the ground-engaging assembly 218 to the outsole 204, as shown in FIGS. 5B, 6B, and 13C.

The foregoing processes may be used to form outsole plates that may be used to manufacture custom-made footwear. For instance, various measurements relating to forces applied by an athlete during use of the article of footwear may be taken into consideration in determining an optimal configuration of the ground-engaging assembly. The customized ground-engaging assembly may be provided as a unitary assembly including the traction elements 248, the connecting members 250, and the fasteners 252 and easily assembled to one or more plies 222, 224 of composite fibers 227 without the need for custom molding hardware.

Custom outsole plates may further allow for tailoring of the stiffness of the plate for a particular wearer of the footwear. For instance, the tendon stiffness and calf muscle strength of an athlete may be measured to determine a suitable stiffness of the plate for use by the athlete. Here, the stiffness of the outsole plate can vary with the strength of the athlete or for the size/condition of the athlete's tendons. Additionally or alternatively, the stiffness of the plate may be tailored based on biomechanics and running mechanics of a particular athlete, such as how the angles of the athlete's joints change during running movements. In some examples, force and motion measurements of the athlete are obtained before manufacturing a custom plate for the athlete. In other examples, plates are manufactured in particular ranges or increments of stiffness to provide semi-custom footwear such that individual athletes may select a suitable stiffness.

In addition to improved performance characteristics, the described implementations of the sole structure 200 provide improved manufacturability of customized footwear by facilitating a modular approach to assembly. For example, any one or more of the components 216, 218, 222, 224 may be substituted for an alternative corresponding component providing different dimensional and/or material properties, as desired.

The following Clauses provide an exemplary configuration for a sole structure and a method of forming a plate for an article of footwear described above.

Clause 1: A sole structure for an article of footwear, the sole structure comprising: a component including a first bundle of fibers affixed to a substrate; a ground-engaging assembly including a first traction element, a second traction element, and a connecting member extending between and connecting the first traction element and the second traction element; and a resin consolidating the first bundle of fibers and entrapping the connecting member to fix a position of the first traction element, the second traction element, and the connecting member relative to the substrate.

Clause 2: The sole structure of Clause 1, wherein at least a portion of the connecting member is entangled in the first bundle of fibers.

Clause 3: The sole structure of Clause 1, wherein at least one of the first traction element, the second traction element, and the connecting member includes a projection extending in a direction toward the substrate.

Clause 4: The sole structure of Clause 3, wherein the projection is entangled in the fibers of the first bundle of fibers.

Clause 5: The sole structure of Clauses 3 or 4, wherein the projection includes a retention feature operable to engage the fibers of the first bundle of fibers.

Clause 6: The sole structure of Clause 5, wherein the retention feature includes at least one arm extending from a shaft, the shaft being received by and extending at least partially into the fibers of the first bundle of fibers.

Clause 7: The sole structure of Clause 6, wherein the at least one arm is formed substantially perpendicular to the shaft.

Clause 8: The sole structure of Clause 6, wherein the at least one arm is formed at an acute angle relative to the shaft.

Clause 9: The sole structure of Clause 6, wherein the at least one arm extends from the shaft in a direction away from the substrate.

Clause 10: The sole structure of Clause 6, wherein the shaft extends through a thickness of the first bundle of fibers.

Clause 11: The sole structure of any of the preceding Clauses, wherein the connecting member is at least partially covered by the resin.

Clause 12: The sole structure of any of the preceding Clauses, further comprising a third traction element attached to at least one of the first traction element and the second traction element by at least one additional connecting member.

Clause 13: The sole structure of any of the preceding Clauses, wherein the first traction element and the second traction element are formed from nylon.

Clause 14: The sole structure of any of the preceding Clauses, wherein the first bundle of fibers includes at least one of carbon fibers, boron fibers, glass fibers, and polymeric fibers.

Clause 15: The sole structure of any of the preceding Clauses, wherein the first bundle of fibers is stitched to the substrate via stitching.

Clause 16: The sole structure of Clause 15, wherein the first bundle of fibers includes first fibers comingled with second fibers, the second fibers including at least one of a different length, thickness, melting temperature, and Young's modulus than the first fibers.

Clause 17: The sole structure of Clause 16, wherein at least one of the stitching, the substrate, the first fibers, and the second fibers comprise a thermoplastic material.

Clause 18: The sole structure of Clause 1, wherein at least one of the fibers of the first bundle of fibers and the substrate comprise a thermoplastic material.

Clause 19: The sole structure of any of the preceding Clauses, wherein the resin is a polymeric resin.

Clause 20: An article of footwear incorporating the sole structure of any of the preceding Clauses.

Clause 21: The article of footwear of Clause 20, wherein the first traction element and the second traction element form a portion of a ground-engaging surface of the article of footwear.

Clause 22: A method of forming a sole structure for an article of footwear, the method comprising: attaching a first bundle of fibers to a flexible substrate; forming a ground-engaging assembly including a first traction element, a second traction element, and a connecting member extending between and connecting the first traction element and the second traction element; consolidating the first bundle of fibers with resin; and entrapping the connecting member with the resin to fix a position of the first traction element, the second traction element, and the connecting member relative to the substrate.

Clause 23: The method of Clause 22, further comprising entangling at least a portion of the connecting member in the first bundle of fibers.

Clause 24: The method of Clause 22, further comprising providing at least one of the first traction element, the second traction element, and the connecting member with a projection that extends in a direction toward the substrate.

Clause 25: The method of Clause 24, further comprising entangling the projection in the fibers of the first bundle of fibers.

Clause 26: The method of Clauses 24 or 25, wherein providing at least one of the first traction element, the second traction element, and the connecting member with a projection includes providing a projection having a retention feature operable to engage the fibers of the first bundle of fibers.

Clause 27: The method of Clause 26, wherein providing a projection having a retention feature includes providing a retention feature having at least one arm extending from a shaft, the shaft being received by and extending at least partially into the fibers of the first bundle of fibers.

Clause 28: The method of Clause 27, further comprising forming the at least one arm substantially perpendicular to the shaft.

Clause 29: The method of Clause 27, further comprising forming the at least one arm at an acute angle relative to the shaft.

Clause 30: The method of Clause 27, further comprising extending the at least one arm from the shaft in a direction away from the substrate.

Clause 31: The method of Clause 27, further comprising extending the shaft through a thickness of the first bundle of fibers.

Clause 32: The method of any of the preceding Clauses, further comprising at least partially covering the connecting member with the resin.

Clause 33: The method of any of the preceding Clauses, further comprising providing the ground-engaging assembly with a third traction element attached to at least one of the first traction element and the second traction element by at least one additional connecting member.

Clause 34: The method of any of the preceding Clauses, further comprising forming the first traction element and the second traction element from nylon.

Clause 35: The method of any of the preceding Clauses, wherein attaching a first bundle of fibers to a flexible substrate includes attaching a first bundle of fibers including at least one of carbon fibers, boron fibers, glass fibers, and polymeric fibers.

Clause 36: The method of any of the preceding Clauses, further comprising stitching the first bundle of fibers to the substrate via stitching.

Clause 37: The method of Clause 36, wherein attaching a first bundle of fibers to a flexible substrate includes attaching a first bundle of fibers including first fibers comingled with second fibers, the second fibers including at least one of a different length, thickness, melting temperature, and Young's modulus than the first fibers.

Clause 38: The method of Clause 37, further comprising forming at least one of the stitching, the substrate, the first fibers, and the second fibers from a thermoplastic material.

Clause 39: The method of Clause 22, further comprising forming at least one of the fibers of the first bundle of fibers and the substrate from a thermoplastic material.

Clause 40: The method of any of the preceding Clauses, wherein consolidating the first bundle of fibers with resin includes consolidating the first bundle of fibers with a polymeric resin.

Clause 41: The method of any of the preceding Clauses, further comprising incorporating the sole structure of any of the preceding Clauses into an article of footwear.

Clause 42: The method of Clause 41, further comprising forming a portion of a ground-engaging surface of the article of footwear with the first traction element and the second traction element.

Clause 43: The method of any of the preceding Clauses, wherein forming a ground-engaging assembly including a first traction element, a second traction element, and a connecting member includes forming the first traction element, the second traction element, and the connecting member using additive manufacturing.

Clause 44: The method of any of the preceding Clauses, wherein forming a ground-engaging assembly including a first traction element, a second traction element, and a connecting member includes forming the first traction element, the second traction element, and the connecting member via three-dimensional (3D) printing.

Clause 45: The method of any of the preceding Clauses, further comprising inserting the ground-engaging assembly into a first mold portion.

Clause 46: The method of Clause 45, wherein inserting the ground-engaging assembly into the first mold portion includes inserting at least one of the first traction element, the second traction element, and the connecting member into a recess of the first mold portion.

Clause 47: The method of Clauses 45 or 46, further comprising positioning the first bundle of fibers in contact with the ground-engaging assembly within the first mold portion.

Clause 48: The method of Clause 47, further comprising compression molding the first bundle of fibers and the ground-engaging assembly to form the sole structure.

Clause 49: The method of any of the preceding Clauses, wherein consolidating the first bundle of fibers with resin includes consolidating the first bundle of fibers with thermoplastic resin comingled with the first bundle of fibers.

Clause 50: The method of Clause 49, further comprising applying heat to the first bundle of fibers to cause the thermoplastic resin to flow.

Clause 51: A sole structure for an article of footwear, the sole structure formed by a process comprising the steps of: attaching a first bundle of fibers to a flexible substrate; forming a ground-engaging assembly including a first traction element, a second traction element, and a connecting member extending between and connecting the first traction element and the second traction element; consolidating the first bundle of fibers with resin; and entrapping the connecting member with the resin to fix a position of the first traction element, the second traction element, and the connecting member relative to the substrate.

Clause 52: The sole structure of Clause 51, wherein at least a portion of the connecting member is entangled in the first bundle of fibers.

Clause 53: The sole structure of Clause 51, wherein at least one of the first traction element, the second traction element, and the connecting member includes a projection extending in a direction toward the substrate.

Clause 54: The sole structure of Clause 53, wherein the projection is entangled in the fibers of the first bundle of fibers.

Clause 55: The sole structure of Clauses 53 or 54, wherein the projection includes a retention feature operable to engage the fibers of the first bundle of fibers.

Clause 56: The sole structure of Clause 55, wherein the retention feature includes at least one arm extending from a shaft, the shaft being received by and extending at least partially into the fibers of the first bundle of fibers.

Clause 57: The sole structure of Clause 56, wherein the at least one arm is formed substantially perpendicular to the shaft.

Clause 58: The sole structure of Clause 56, wherein the at least one arm is formed at an acute angle relative to the shaft.

Clause 59: The sole structure of Clause 56, wherein the at least one arm extends from the shaft in a direction away from the substrate.

Clause 60: The sole structure of Clause 56, wherein the shaft extends through a thickness of the first bundle of fibers.

Clause 61: The sole structure of any of the preceding Clauses, wherein the connecting member is at least partially covered by the resin.

Clause 62: The sole structure of any of the preceding Clauses, further comprising a third traction element attached to at least one of the first traction element and the second traction element by at least one additional connecting member.

Clause 63: The sole structure of any of the preceding Clauses, wherein the first traction element and the second traction element are formed from nylon.

Clause 64: The sole structure of any of the preceding Clauses, wherein the first bundle of fibers includes at least one of carbon fibers, boron fibers, glass fibers, and polymeric fibers.

Clause 65: The sole structure of any of the preceding Clauses, wherein the first bundle of fibers is stitched to the substrate via stitching.

Clause 66: The sole structure of Clause 65, wherein the first bundle of fibers includes first fibers comingled with second fibers, the second fibers including at least one of a different length, thickness, melting temperature, and Young's modulus than the first fibers.

Clause 67: The sole structure of Clause 66, wherein at least one of the stitching, the substrate, the first fibers, and the second fibers comprise a thermoplastic material.

Clause 68: The sole structure of Clause 51, wherein at least one of the fibers of the first bundle of fibers and the substrate comprise a thermoplastic material.

Clause 69: The sole structure of any of the preceding Clauses, wherein the resin is a polymeric resin.

Clause 70: An article of footwear incorporating the sole structure of any of the preceding Clauses.

Clause 71: The article of footwear of Clause 70, wherein the first traction element and the second traction element form a portion of a ground-engaging surface of the article of footwear.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A sole structure for an article of footwear, the sole structure comprising:
   a component including a first bundle of fibers affixed to a substrate;
   a ground-engaging assembly including:
      a first traction element and a second traction element each extending in a first direction,
      a connecting member extending between and connecting the first traction element and the second traction element to form a web, and
      a fastener formed as a projection extending from at least one of the first traction element, the second traction element, and the connecting member in a second direction different from the first direction, the fastener including a shaft received by and extending at least partially into fibers of the first bundle of fibers and a retention feature disposed at an end of the shaft and having a width that is greater than a width of the shaft, the retention feature operable to engage the fibers of the first bundle of fibers; and
   a resin consolidating the first bundle of fibers and entrapping the connecting member to fix a position of the first traction element, the second traction element, and the connecting member relative to the substrate.

2. The sole structure of claim 1, wherein at least a portion of the connecting member is entangled in the first bundle of fibers.

3. The sole structure of claim 1, wherein the projection is entangled in the fibers of the first bundle of fibers.

4. The sole structure of claim 1, wherein the connecting member is at least partially covered by the resin.

5. The sole structure of claim 1, wherein the first bundle of fibers includes at least one of carbon fibers, boron fibers, glass fibers, and polymeric fibers.

6. The sole structure of claim 1, wherein the first bundle of fibers is stitched to the substrate via stitching.

7. The sole structure of claim 6, wherein the first bundle of fibers includes first fibers comingled with second fibers, the second fibers including at least one of a different length, thickness, melting temperature, and Young's modulus than the first fibers.

8. An article of footwear incorporating the sole structure of claim 1.

9. The sole structure of claim 1, wherein the connecting member directly connects the first traction element to the second traction element to form the web.

10. The sole structure of claim 1, wherein the first traction element, the second traction element, and the connecting member are integrally formed of the same material.

11. A method of forming a sole structure for an article of footwear, the method comprising:
    attaching a first bundle of fibers to a flexible substrate;
    forming a ground-engaging assembly including:
       a first traction element and a second traction element each extending in a first direction,
       a connecting member extending between and connecting the first traction element and the second traction element to form a web, and
       a fastener formed as a projection that extends from at least one of the first traction element, the second traction element, and the connecting member in a second direction different from the first direction, the fastener including a shaft received by and extending at least partially into the fibers of the first bundle of fibers and a retention feature disposed at an end of the shaft and having a width that is greater than a width of the shaft, the retention feature operable to engage the fibers of the first bundle of fibers;
    consolidating the first bundle of fibers with resin; and
    entrapping the connecting member with the resin to fix a position of the first traction element, the second traction element, and the connecting member relative to the substrate.

12. The method of claim 11, further comprising entangling at least a portion of the connecting member in the first bundle of fibers.

13. The method of claim 11, further comprising entangling the projection in the fibers of the first bundle of fibers.

14. The method of any of claim 11, further comprising at least partially covering the connecting member with the resin.

* * * * *